US012762391B2

(12) United States Patent
Ozcan et al.

(10) Patent No.: US 12,762,391 B2
(45) Date of Patent: Oct. 13, 2026

(54) SCALE-, SHIFT-, AND ROTATION-INVARIANT DIFFRACTIVE OPTICAL NETWORKS

(71) Applicant: THE REGENTS OF THE UNIVERSITY OF CALIFORNIA, Oakland, CA (US)

(72) Inventors: Aydogan Ozcan, Los Angeles, CA (US); Deniz Mengu, Los Angeles, CA (US); Yair Rivenson, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 737 days.

(21) Appl. No.: 18/249,726

(22) PCT Filed: Oct. 22, 2021

(86) PCT No.: PCT/US2021/056161
§ 371 (c)(1),
(2) Date: Apr. 19, 2023

(87) PCT Pub. No.: WO2022/087345
PCT Pub. Date: Apr. 28, 2022

(65) Prior Publication Data

US 2023/0401436 A1 Dec. 14, 2023

Related U.S. Application Data

(60) Provisional application No. 63/105,138, filed on Oct. 23, 2020.

(51) Int. Cl.
*G06N 3/067* (2006.01)
*G02B 1/00* (2006.01)
(Continued)

(52) U.S. Cl.
CPC ............. *G06N 3/067* (2013.01); *G06N 3/045* (2023.01); *G06N 3/084* (2013.01); *G02B 1/002* (2013.01)

(58) Field of Classification Search
CPC ........ G06N 3/067; G06N 3/045; G06N 3/084; G06N 3/09; G02B 1/002; G02B 5/1842; G02B 27/4277; G02B 27/4272
(Continued)

(56) References Cited

U.S. PATENT DOCUMENTS

| | | | |
|---|---|---|---|
| 4,963,725 A | 10/1990 | Hong et al. | |
| 5,080,464 A | 1/1992 | Toyoda | |

(Continued)

FOREIGN PATENT DOCUMENTS

| | | | | |
|---|---|---|---|---|
| EP | 4147171 A1 | | 3/2023 | |
| TW | 202029067 A | * | 8/2020 | ........... G06N 3/0675 |

(Continued)

OTHER PUBLICATIONS

Bagherian, H. et al., On-Chip Optical Convolutional Neural Networks, arXiv:1808.03303v2 [cs.ET] Aug. 16, 2018.

(Continued)

*Primary Examiner* — Jennifer Mehmood
*Assistant Examiner* — Heath E. Wells
(74) *Attorney, Agent, or Firm* — VISTA IP LAW GROUP LLP

(57) ABSTRACT

A method of forming an optical neural network for processing an input object image or optical signal that is invariant to object transformations includes training a software-based neural network model to perform one or more specific optical functions for a multi-layer optical network having physical features located in each of the layers of the optical neural network. The training includes feeding different input object images or optical signals that have random transfor-
(Continued)

mations or shifts and computing at least one optical output of optical transmission and/or reflection through the optical neural network using an optical wave propagation model and iteratively adjusting transmission/reflection coefficients for each layer until optimized transmission/reflection coefficients are obtained. A physical embodiment of the optical neural network is then made that has a plurality of substrate layers having physical features that match the optimized transmission/reflection coefficients obtained by the trained neural network model.

20 Claims, 14 Drawing Sheets

(51) Int. Cl.
*G06N 3/045* (2023.01)
*G06N 3/084* (2023.01)

(58) Field of Classification Search
USPC .......... 382/156
See application file for complete search history.

(56) References Cited

U.S. PATENT DOCUMENTS

| | | | |
|---|---|---|---|
| 5,095,459 | A | 3/1992 | Ohta et al. |
| 5,255,362 | A | 10/1993 | Brandstetter et al. |
| 5,440,671 | A | 8/1995 | Shiratani et al. |
| 5,842,191 | A | 11/1998 | Stearns |
| 6,445,470 | B1 | 9/2002 | Jenkins et al. |
| 7,512,473 | B2 | 3/2009 | Nakao |
| 9,459,148 | B2 | 10/2016 | Golub et al. |
| 10,217,023 | B1 | 2/2019 | Rubin |
| 10,664,722 | B1 | 5/2020 | Sharma et al. |
| 10,803,328 | B1 | 10/2020 | Bai et al. |
| 11,017,309 | B2 | 5/2021 | Roques-Carmes et al. |
| 11,392,830 | B2 | 7/2022 | Ozcan |
| 11,694,082 | B2 | 7/2023 | Ozcan et al. |
| 12,086,717 | B2 | 9/2024 | Ozcan et al. |
| 2001/0046046 | A1 | 11/2001 | Schoeppe |
| 2002/0072676 | A1 | 6/2002 | Afanassieva |
| 2007/0098594 | A1 | 5/2007 | Elkin et al. |
| 2009/0003815 | A1 | 1/2009 | Polidor et al. |
| 2010/0209830 | A1 | 8/2010 | Carcasi et al. |
| 2014/0093147 | A1 | 4/2014 | Stewart et al. |
| 2014/0304203 | A2 | 10/2014 | Appuhamillage et al. |
| 2017/0351293 | A1 | 12/2017 | Carolan et al. |
| 2019/0294967 | A1 | 9/2019 | Kumar et al. |
| 2019/0340418 | A1 | 11/2019 | Zecchini et al. |
| 2019/0369411 | A1* | 12/2019 | Piestun .......... G02B 27/4205 |
| 2019/0370652 | A1 | 12/2019 | Shen et al. |
| 2020/0327403 | A1* | 10/2020 | Du .......... G02B 27/12 |
| 2021/0073959 | A1* | 3/2021 | Elmalem .......... G06T 7/50 |
| 2021/0142170 | A1* | 5/2021 | Ozcan .......... G06N 3/0455 |
| 2021/0287078 | A1* | 9/2021 | Liu .......... G06N 3/04 |
| 2022/0253685 | A1 | 8/2022 | Ozcan et al. |
| 2022/0327371 | A1 | 10/2022 | Ozcan et al. |
| 2022/0366253 | A1 | 11/2022 | Ozcan et al. |
| 2023/0024787 | A1 | 1/2023 | Ozcan et al. |
| 2023/0153600 | A1 | 5/2023 | Ozcan et al. |
| 2023/0401447 | A1 | 12/2023 | Ozcan et al. |

FOREIGN PATENT DOCUMENTS

| | | | | |
|---|---|---|---|---|
| WO | WO 2017/223560 | A1 | 12/2017 | |
| WO | WO 2018209438 | A1 | 11/2018 | |
| WO | WO-2019200289 | A1 * | 10/2019 | .......... G06N 3/0675 |
| WO | WO 2020/247828 | A1 | 12/2020 | |
| WO | WO 2021/050550 | A1 | 3/2021 | |
| WO | WO 2021/231139 | A1 | 11/2021 | |
| WO | WO 2021/237170 | A1 | 11/2021 | |
| WO | WO 2022/006018 | A1 | 1/2022 | |
| WO | WO 2022/056422 | A1 | 3/2022 | |
| WO | WO 20220/87345 | A1 | 4/2022 | |
| WO | WO 2023/287586 | A1 | 1/2023 | |

OTHER PUBLICATIONS

Brunner, D. et al., Parallel photonic information processing at gigabyte per second data rates using transient states, Nature Communications, 4:1364, DOI: 10.1038/ncomms2368, www.nature.com/naturecommunications.

Bueno, J. et al., Reinforcement Learning in a large scale photonic Recurrent Neural Network, arXiv:1711.05133v2 [cs.NE] Nov. 15, 2017.

Chakraborty, I. et al., Toward Fast Neural Computing using All-Photonic Phase Change Spiking Neurons, arXiv:1804.00267v2 [cs.ET] Aug. 28, 2018.

Chang, J. et al., Hybrid optical-electronic convolutional neural networks with optimized diffractive optics for image classification, Scientific Report (2018) 8:12324, DOI:10.1038/s41598-018-30619-y.

Chen, Y. et al., Deep Learning-Based Classification of Hyperspectral Data, IEEE Journal of Selected Topics in Applied Earth Observations and Remote Sensing, vol. 7, No. 6, Jun. 2014.

Cignoni, P. et al., MeshLab: an Open-Source Mesh Processing Tool, Eurographics Italian Chapter Conference (2008).

Farhat, N. H. et al., Optical implementation of the Hopfield model, May 15, 1985, vol. 24, No. 10, Applied Optics, 1469-1475.

Girshick, R. et al., Rich feature hierarchies for accurate object detection and semantic segmentation Tech report (v5), arXiv:1311.2524v5 [cs.CV] Oct. 22, 2014.

Golik, P. et al., Cross-Entropy vs. Squared Error Training: a Theoretical and Experimental Comparison, Human Language Technology and Pattern Recognition, Computer Science Department, RWTH Aachen University, 52056 Aachen, Germany (2013).

Grischkowsky, D. et al., Far-infrared time-domain spectroscopy with terahertz beams of dielectrics and semiconductors, J. Opt. Soc. Am. B/vol. 7, No. 10/Oct. 1990.

Hermans, M. etal., Trainable & Dynamic Computing: Error Backpropagation Through Physical Media, arXiv:1407.6637v1 [cs.NE] Jul. 24, 2014.

Hughes, T.W. et al., Training of photonic neural networks through in situ backpropagation, arXiv:1805.09943v1 [physics optics] May 25, 2018.

Kazhdan, M. et al., Screened Poisson Surface Reconstruction, ACM Transactions on Graphics, vol. VV, No. N, Article XXX, Publication date: 2013.

Khorasaninejad, M. et al., Metalenses at visible wavelengths: Diffraction-limited focusing and subwavelength resolution imaging, sciencemag.org, Science, Jun. 3, 2016, vol. 352, Issue 6290, 1190-1194.

Kildishev, A. V. et al., Planar Photonics with Metasurfaces, Science 339, 1232009 (2013). DOI: 10.1126/science.1232009.

Kingma, D. P. et al., ADAM: A Method for Stochastic Optimization, arXiv:1412.6980v9 [cs.LG] Jan. 30, 2017.

Lecun, Y. et al., GradientBased Learning Applied to Document Recognition, Proc. of the IEEE, Nov. 1998 (46 pages).

Lin, X. et al., All-optical machine learning using diffractive deep neural networks, Science 361, 1004-1008 (2018), Sep. 7, 2018.

Psaltis, D. et al., Optical information processing based on an associative-memory model of neural nets with thresholding and feedback, Optics Letters, vol. 10, No. 2, Feb. 1985.

Psaltis, D. et al., Adaptive optical networks using photorefractive crystals, Applied Optics, vol. 27, No. 9, May 1, 1988.

Shastri, B. et al., Principles of Neuromorphic Photonics, arXiv:1801.00016v1 [cs.ET] Dec. 29, 2017.

Shen, Y. et al., Deep Learning with Coherent Nanophotonic Circuits, arXiv:1610.02365v1 [physics.optics] Oct. 7, 2016.

Srivastava, N. et al., Dropout: A Simple Way to Prevent Neural Networks from Overfitting, Journal of Machine Learning Research 15 (2014) 1929-1958 Submitted Nov. 2013; Published Jun. 2014.

Tang, Y. et al., Deep Learning using Linear Support Vector Machines, arXiv:1306.0239v4 [cs.LG] Feb. 21, 2015.

(56) References Cited

OTHER PUBLICATIONS

Trabelsi, C. et al., Deep Complex Networks, arXiv:1705.09792v4 [cs.NE] Feb. 25, 2018.
Wagner, K. et al., Multilayer optical learning networks, Dec. 1, 1987, vol. 26, No. 23, Applied Optics, 5061-5076.
Wan, Li et al., Regularization of Neural Networks using DropConnect, Proceedings of the 30 th International Conference on Machine Learning, Atlanta, Georgia, USA, 2013.
Wang, Z. et al., Image Quality Assessment: From Error Visibility to Structural Similarity, IEEE Transactions on Image Processing, vol. 13, No. 4, Apr. 2004.
Weverka, R. T. et al., Fully interconnected, two-dimensional neural arrays using wavelength-multiplexed volume holograms, Optics Letters, vol. 16, No. 11, Jun. 1, 1991.
Xiao, Y. et al., Nonlinear Metasurface Based on Giant Optical Kerr Response of Gold Quantum Wells, ACS Photonics, 5(5), May 1, 2018, DOI:10.1021/acsphotonics.7b01140.
Yin, X. et al., Artificial Kerr-type medium using metamaterials, Apr. 9, 2012, vol. 20, No. 8, Optics Express, 8543-8550.
PCT International Search Report for PCT/US2019/027275, Applicant: The Regents of the University of California, Form PCT/ISA/210 and 220, dated Aug. 19, 2019 (5 pages).
PCT Written Opinion of the International Search Authority for PCT/US2019/027275, Applicant: The Regents of the University of California, Form PCT/ISA/237, dated Aug. 19, 2019 (9 pages).
Javidi, B. et al., Optical implementation of neural networks for face recognition by the use of nonlinear joint transform correlators, Applied Optics, vol. 34, No. 20, Jul. 10, 1995, 3950-3962.
Jutamulia, S. et al., Overview of hybrid optical neural networks, Optics & Laser Technology, vol. 28, No. 2, pp. 59-72, 1996.
Psaltis, D. et al., Holography in artificial neural networks. Nature. 343, 325-330 (1990).
Soures, N. et al., Neuro-MMI: A Hybrid Photonic-Electronic Machine Learning Platform. In 2018 IEEE Photonics Society Summer Topical Meeting Series (SUM); 2018; pp. 187-188.
Yu, F. T. S., II Optical Neural Networks: Architecture, Design and Models. In Progress in Optics; Wolf, E., Ed.; Elsevier, 1993; vol. 32, pp. 61-144.
Yu, F. et al., Flat optics with designer metasurfaces. Nature Materials. 13, 139-150 (2014).
Caulfield, H.J. et al., Optical Neural Networks. Proc. IEEE 1989, 77 (10), 1573-1583.
PCT International Preliminary Report on Patentability (Chapter I of the Patent Cooperation Treaty) for PCT/US2019/027275, Applicant: The Regents of the University of California, Form PCT/IB/326 and 373, dated Oct. 22, 2020 (11 pages).
PCT International Search Report for PCT/US2021/056161, Applicant: The Regents of the University of California, Form PCT/ISA/210 and 220, dated Jan. 18, 2022 (3 pages).
PCT Written Opinion of the International Search Authority for PCT/US2021/056161, Applicant: The Regents of the University of California, Form PCT/ISA/237, Docket No. 2021-103-2US, dated Jan. 18, 2022 (6 pages).
Tyler H. Hughes et al., Training of photonic neural networks through in situ backpropagation, arXiv:1805.09943v1 [physics.optics] May 25, 2018.
Onur Kulce et al., All-Optical Information Processing Capacity of Diffractive Surfaces, (2020), (31 pages).
Jingxi Li et al., Machine Vision using Diffractive Spectral Encoding, (2020), (16 pages).
Deniz Mengu et al., Misalignment resilient diffractive optical networks, Nanophotonics 2020, (13 pages).
Mihika Prabhu et al., A Recurrent Ising Machine in a Photonic Integrated Circuit, arXiv:1909.13877v1 [physics.optics] Sep. 30, 2019.
Yichen Shen et al., Deep Learning with Coherent Nanophotonic Circuits, arXiv:1610.02365v1 [physics.optics] Oct. 7, 2016.
Muhammed Veli et al., Terahertz pulse shaping using diffractive surfaces, Nature Communications, https://doi.org/10.1038/s41467-020-20268-Z.
PCT International Preliminary Report on Patentability (Chapter I of the Patent Cooperation Treaty) for PCT/US2021/056161, Applicant: The Regents of the University of California, Form PCT/IB/326 and 373, dated May 4, 2023 (8 pages).
PCT International Search Report for PCT/US2021/030736, Applicant: The Regents of the University of California, Form PCT/ISA/210 and 220, dated Aug. 18, 2021 (4 pages).
PCT Written Opinion of the International Search Authority for PCT/US2021/030736, Applicant: The Regents of the University of California, Form PCT/ISA/237, dated Aug. 18, 2021 (20 pages).
Xing Lin et al., All-optical machine learning using diffractive deep neural networks, Science, 361, 1004-1008 (2018).
Julie Chang et al., Hybrid optical-electronic convolutional neural networks with optimized diffractive optics for image classification, Scientific Reports, (2018), 8:12324, DOI:10.1038/s41598-018-30619-y.
Shane Colburn et al., An Optical Frontend for a Convolutional Neural Network, (2019) (13 pages).
Philipp del Hougne et al., Learned Integrated Sensing Pipeline: Reconfigurable Metasurface Transceivers as Trainable Physical Layer in an Artificial Neural Network, Adv. Sci. 2020, 7, 1901913 (8 pages).
Thomas Ferreira de Lima et al., Progress in neuromorphic photonics, Nanophotonics (2017) (23 pages).
J. Feldmann et al., All-optical spiking neurosynaptic networks with self-learning capabilities, Nature (May 2019) 569 (7755): 208-214.
Kaiming He et al., Deep Residual Learning for Image Recognition, Computer Vision Foundation, (2016), (9 pages).
J. J. Hopfield, Neural networks and physical systems with emergent collective computational abilities, Proc. Natl. Acad. Sci. USA, vol. 79, pp. 2554-2558 (Apr. 1982).
Erfan Khoram et al., Nanophotonic Media for Artificial Neural Inference, arXiv:1810.07815v4 [physics.optics] Jun. 10, 2019.
Alex Krizhevsky et al., ImageNet Classification with Deep Convolutional Neural Networks, (2017), (9 pages).
Iro Lain et al., Deeper Depth Prediction with Fully Convolutional Residual Networks, arXiv:1606.00373v2 [cs.CV] Sep. 19, 2016 (12 pages).
Jingxi Li et al., Class-specific Differential Detection in Diffractive Optical Neural Networks Improves Inference Accuracy, (2019), (21 pages).
Xing Lin et al., All-optical machine learning using diffractive deep neural networks, Science, 10.1126/science.aat8084 (2018).
Lidan Lu et al., Miniaturized Diffraction Grating Design and Processing for Deep Neural Network, DOI: 10.1109/LPT.2019.2948626, IEEE Photonics Technology Letters (2019).
Yi Luo et al., Design of Task-Specific Optical Systems Using Broadband Diffractive Neural Networks, (2019), (36 pages).
Sheler Maktoobi et al., Diffractive coupling for photonic networks: how big can we go?, arXiv:1907.05661v1 [physics.optics] Jul. 12, 2019, (8 pages).
Deniz Mengu et al., Analysis of Diffractive Optical Neural Networks and Their Integration with Electronic Neural Networks, IEEE J Sel Top Quantum Electron., (2020), 26(1), doi:10.1109/JSTQE.2019.2921376 (38 pages).
Chao Qian et al., Performing optical logic operations by a diffractive neural network, Light: Science and Applications, 9, 59 -. Doi:10.1038/s41377-020-0303-2, (2020), (8 pages).
Olaf Ronneberger et al., U-Net: Convolutional Networks for Biomedical Image Segmentation, N. Navab et al. (Eds.): MICCAI 2015, Part III, LNCS 9351, pp. 234-241, 2015, DOI:10.1007/978-3-319-24574-4_28.
David E. Rumelhart et al., Learning representations by back-propagating errors, Nature Publishing Group, (1986), (4 pages).
Nezih T. Yardimci et al., High Power Terahertz Generation Using Large Area Plasmonic Photoconductive Emitters, IEEE Transactions on Terahertz Science and Technology, (2015), (7 pages).
Nezih Tolga Yardimci et al., High Sensitivity Terahertz Detection through Large-Area Plasmonic Nano-Antenna Arrays, Scientific Reports, 7:42667, DOI:10.1038/srep42667, (2017), (8 pages).
Ying Zuo et al., All Optical Neural Network with Nonlinear Activation Functions, arXiv:1904.10819v1 [physics.optics] Apr. 24, 2019.

(56) References Cited

OTHER PUBLICATIONS

PCT International Preliminary Report on Patentability (Chapter I of the Patent Cooperation Treaty) for PCT/US2021/030736, Applicant: The Regents of the University of California, Form PCT/IB/326 and 373, dated Nov. 24, 2022 (22 pages).
The extended European search report dated Sep. 11, 2024 for European Patent Application No. 21883945.4, (12 pages).
Communication pursuant to Rules 70(2) and 70a(2) EPC dated Sep. 11, 2024 for European Patent Application No. 21883945.4, (1 page).
Response to the extended European search report dated Apr. 1, 2025 for European Patent Application No. 21883945.4, (16 pages).
Alexandra Carlson et al., Modeling Camera Effects to Improve Visual Learning from Synthetic Data, L. Leal-Taixe and S. Roth (Eds.): ECCV 2018 Workshops, LNCS 11129, pp. 505-520 (2019).
Shuming Jiao et al., Optical machine learning with incoherent light and a single-pixel detector, Arxiv.org, Cornell University Library, 201 Olin Library Cornell University Ithaca, NY 14853, Apr. 24, 2019, XP081537995, DOI:10.1364/OL.44.005186.
Jingxi Li et al., Class-specific differential detection in diffractive optical neural networks improves inference accuracy, Advanced Photonics, 046001-13, vol. 1(4), Jul./Aug. 2019.
Communication regarding the Extended European Search Report dated Sep. 27, 2023, for European Patent Application No. 21804948.4, (7 pages).
Communication pursuant to Rules 70(2) and 70a(2) EPC dated Oct. 17, 2023, for European Patent Application No. 21804948.4, (1 page).
Response to the Extended European Search Report dated Apr. 29, 2024, for European Patent Application No. 21804948.4, (101 pages).

* cited by examiner

| shift \ rotation | $\theta_{tr} = \theta_{test} = 0°$ | $\theta_{tr}$ and $\theta_{test}$ are iid $U(-10°, 10°)$ | $\theta_{tr}$ and $\theta_{test}$ are iid $U(-20°, 20°)$ |
|---|---|---|---|
| $\Delta_{tr} = \Delta_{test} = 0\lambda$ | 97.64 | 97.64 | 97.13 |
| $\Delta_{tr}$ and $\Delta_{test}$ are iid $U(-2.12\lambda, 2.12\lambda)$ | 97.51 | 97.48 | 96.78 |
| $\Delta_{tr}$ and $\Delta_{test}$ are iid $U(-8.48\lambda, 8.48\lambda)$ | 94.41 | 94.09 | 92.00 |

| shift \ scaling | $K_{tr} = K_{test} = 1$ | $K_{tr}$ and $K_{test}$ are iid $U(0.6, 1.4)$ | $K_{tr}$ and $K_{test}$ are iid $U(0.2, 1.8)$ |
|---|---|---|---|
| $\Delta_{tr} = \Delta_{test} = 0\lambda$ | 97.64 | 97.29 | 96.50 |
| $\Delta_{tr}$ and $\Delta_{test}$ are iid $U(-2.12\lambda, 2.12\lambda)$ | 97.51 | 96.79 | 95.76 |
| $\Delta_{tr}$ and $\Delta_{test}$ are iid $U(-8.48\lambda, 8.48\lambda)$ | 94.41 | 91.71 | 89.20 |

| scaling \ rotation | $\theta_{tr} = \theta_{test} = 0°$ | $\theta_{tr}$ and $\theta_{test}$ are iid $U(-10°, 10°)$ | $\theta_{tr}$ and $\theta_{test}$ are iid $U(-20°, 20°)$ |
|---|---|---|---|
| $K_{tr} = K_{test} = 1$ | 97.64 | 97.64 | 97.13 |
| $K_{tr}$ and $K_{test}$ are iid $U(0.6, 1.4)$ | 97.29 | 96.98 | 96.26 |
| $K_{tr}$ and $K_{test}$ are iid $U(0.2, 1.8)$ | 96.50 | 96.24 | 95.67 |

*FIG. 15*

| Predicted Class \ Target Class | 0 | 1 | 2 | 3 | 4 | 5 | 6 | 7 | 8 | 9 |
|---|---|---|---|---|---|---|---|---|---|---|
| 0 | 973 | 0 | 4 | 1 | 1 | 4 | 4 | 1 | 4 | 4 |
| 1 | 0 | 1120 | 1 | 0 | 1 | 0 | 2 | 2 | 0 | 3 |
| 2 | 0 | 4 | 999 | 3 | 1 | 0 | 0 | 14 | 3 | 1 |
| 3 | 4 | 1 | 10 | 989 | 0 | 11 | 0 | 4 | 4 | 10 |
| 4 | 1 | 1 | 2 | 0 | 951 | 0 | 2 | 2 | 4 | 5 |
| 5 | 0 | 0 | 0 | 5 | 0 | 865 | 5 | 1 | 3 | 1 |
| 6 | 1 | 3 | 1 | 0 | 8 | 4 | 943 | 0 | 4 | 0 |
| 7 | 0 | 0 | 5 | 3 | 0 | 2 | 0 | 987 | 3 | 3 |
| 8 | 1 | 5 | 10 | 3 | 2 | 4 | 2 | 4 | 943 | 4 |
| 9 | 0 | 1 | 0 | 6 | 18 | 2 | 0 | 13 | 6 | 978 |

FIG. 17A

| Predicted Class \ Target Class | 0 | 1 | 2 | 3 | 4 | 5 | 6 | 7 | 8 | 9 |
|---|---|---|---|---|---|---|---|---|---|---|
| 0 | 966 | 0 | 6 | 0 | 1 | 3 | 9 | 0 | 7 | 10 |
| 1 | 1 | 1123 | 0 | 0 | 5 | 1 | 3 | 7 | 5 | 3 |
| 2 | 1 | 3 | 1000 | 9 | 3 | 0 | 1 | 8 | 2 | 0 |
| 3 | 0 | 2 | 3 | 974 | 0 | 7 | 0 | 3 | 4 | 9 |
| 4 | 1 | 3 | 4 | 1 | 947 | 2 | 8 | 1 | 5 | 8 |
| 5 | 1 | 0 | 0 | 12 | 0 | 865 | 12 | 1 | 10 | 4 |
| 6 | 4 | 1 | 1 | 0 | 9 | 4 | 920 | 0 | 3 | 3 |
| 7 | 1 | 0 | 6 | 6 | 1 | 2 | 0 | 990 | 2 | 3 |
| 8 | 5 | 2 | 12 | 4 | 3 | 8 | 5 | 2 | 932 | 7 |
| 9 | 0 | 1 | 0 | 4 | 13 | 0 | 0 | 16 | 4 | 962 |

FIG. 17B

| Predicted Class \ Target Class | 0 | 1 | 2 | 3 | 4 | 5 | 6 | 7 | 8 | 9 |
|---|---|---|---|---|---|---|---|---|---|---|
| 0 | 969 | 0 | 5 | 0 | 2 | 2 | 6 | 0 | 4 | 5 |
| 1 | 1 | 1119 | 3 | 1 | 4 | 0 | 3 | 5 | 0 | 5 |
| 2 | 0 | 2 | 987 | 5 | 5 | 0 | 1 | 13 | 1 | 0 |
| 3 | 0 | 3 | 3 | 980 | 0 | 2 | 1 | 2 | 6 | 6 |
| 4 | 1 | 0 | 4 | 0 | 945 | 1 | 4 | 3 | 8 | 11 |
| 5 | 0 | 0 | 1 | 5 | 0 | 867 | 7 | 0 | 4 | 4 |
| 6 | 2 | 1 | 4 | 0 | 8 | 7 | 931 | 0 | 1 | 1 |
| 7 | 1 | 0 | 8 | 7 | 0 | 2 | 0 | 991 | 2 | 8 |
| 8 | 5 | 10 | 17 | 8 | 1 | 10 | 5 | 4 | 943 | 3 |
| 9 | 1 | 0 | 0 | 4 | 17 | 1 | 0 | 10 | 5 | 966 |

*FIG. 17C*

SCALE-, SHIFT-, AND ROTATION-INVARIANT DIFFRACTIVE OPTICAL NETWORKS

RELATED APPLICATION

This Application is a U.S. National Stage filing under 35 U.S.C. § 371 of International Application No. PCT/US2021/056161, filed on Oct. 22, 2021, which claims priority to U.S. Provisional Patent Application No. 63/105,138 filed on Oct. 23, 2020, which are hereby incorporated by reference. Priority is claimed pursuant to 35 U.S.C. §§ 119, 371 and any other applicable statute.

TECHNICAL FIELD

The technical field relates to an optical deep learning physical architecture or platform that can perform, at the speed of light, various complex functions. In particular, the technical field relates to an optical neural network design that uses a new training strategy for diffractive neural networks that introduces input object translation, rotation and/or scaling during the training phase as uniformly distributed random variables to build resilience in their blind inference performance against such object transformations.

BACKGROUND

Motivated by the success of deep learning in various applications, optical neural networks have gained an important momentum in recent years. Although optical neural networks and related optical computing hardware are relatively at an earlier stage in terms of their inference and generalization capabilities, when compared to the state-of-the-art electronic deep neural networks and the underlying digital processors, optics/photonics technologies might potentially bring significant advantages for machine learning systems in terms of their power efficiency, parallelism and computational speed. Among different physical architectures used for the design of optical neural networks, Diffractive Deep Neural Networks ($D^2NNs$) utilize the diffraction of light through engineered surfaces/layers to form an optical network that is based on light-matter interaction and free-space propagation of light. $D^2NNs$ offer a unique optical machine learning framework that formulates a given learning task as a black-box function approximation problem, parameterized through the trainable physical features of matter that control the phase and/or amplitude of light. One of the most convenient methods to devise a $D^2NN$ is to employ multiple transmissive and/or reflective diffractive surfaces/layers that collectively form an optical network between an input and output field-of-view. During the training stage, the transmission/reflection coefficient values of the layers of a $D^2NN$ are designed for a given statistical (or deterministic) task/goal, where each diffractive feature (i.e., neuron) of a given layer is iteratively adjusted during the training phase using e.g., the error back-propagation method. After this training and design phase, the resulting diffractive layers/substrate layers are physically fabricated using e.g., 3D printing or lithography, to form a passive optical network that performs inference as the input light diffracts from the input plane to the output. Alternatively, the final diffractive layer models can also be implemented by using various types of spatial light modulators (SLMs) to bring reconfigurability and data adaptability to the diffractive neural network, at the expense of e.g., increased power consumption of the system.

Since the initial experimental demonstration of image classification using $D^2NNs$ that are composed of 3D-printed diffractive layers, the optical inference capacity of diffractive optical networks has been significantly improved based on e.g., differential detection scheme, class-specific designs and ensemble-learning techniques. Owing to these systematic advances in diffractive optical networks and training methods, recent studies have reported classification accuracies of >98%, >90% and >62% for the datasets of handwritten digits (MNIST), fashion products (Fashion-MNIST) and CIFAR-10 images, respectively. Beyond classification tasks, diffractive neural networks were also shown to serve as trainable optical front-ends, forming hybrid (optical-electronic) machine learning systems. Replacing the conventional imaging-optics in machine vision systems with diffractive optical networks has been shown to offer unique opportunities to lower the computational complexity and burden on back-end electronic neural networks as well as to mitigate the inference accuracy loss due to pixel-pitch limited, low-resolution imaging systems. Furthermore, diffractive optical networks have been trained to encode the spatial information of input objects into the power spectrum of the diffracted broadband light, enabling object classification and image reconstruction using only a single-pixel spectroscopic detector at the output plane, demonstrating an unconventional, task-specific and resource-efficient machine vision platform. This extension of diffractive optical networks and the related training models to conduct inference based on broadband light sources could also be important for processing colorful objects or images at multiple spectral bands, covering e.g., red, green and blue channels in the visible part of the spectrum. In all of these existing diffractive optical network designs, the inference accuracies are in general sensitive to object transformations such as e.g., lateral translation, rotation, and/or scaling of the input objects that are frequently encountered in various machine vision applications.

SUMMARY

In one embodiment, a diffractive or optical neural network design is disclosed that uses a training strategy for diffractive neural networks that introduces input object translation, rotation and/or scaling during the training phase as uniformly distributed random variables to build resilience in their blind inference performance against such object transformations. To address the sensitivity issues of conventional diffractive optical networks to these uncertainties associated with the lateral position, scale and in-plane orientation/rotation angle of the input objects, a new $D^2NN$ design scheme is disclosed that formulates these object transformations through random variables used during the deep learning-based training phase of the substrate layers that makeup the diffractive layers. In this manner, the evolution of the layers of a diffractive optical network can adapt to random translation, scaling and rotation of the input objects or signals and, hence, the blind inference capacity of the optical network can be maintained despite these input object/signal uncertainties. The training strategy enables diffractive optical networks to find applications in machine vision systems that require low-latency as well as memory- and power-efficient inference engines for monitoring dynamic events. Beyond diffractive neural networks, the outlined training method can be utilized in other optical machine learning platforms as well as in deep learning-based inverse design problems to create robust solutions that can sustain their target performance against undesired/uncontrolled input field transformations.

In one embodiment, an optical neural network for processing an input object image or signal that is invariant or partially invariant to object transformations includes: a plurality of optically transmissive and/or reflective substrate layers arranged in an optical path, each of the plurality of optically transmissive and/or reflective substrate layers comprising a plurality of physical features formed on or within the plurality of optically transmissive or reflective substrate layers and having different transmission and/or reflection coefficients as a function of the lateral coordinates across each substrate layer, wherein the plurality of optically transmissive and/or reflective substrate layers and the plurality of physical features thereon collectively define a trained mapping function between the input object image or signal to the plurality of optically transmissive and/or reflective substrate layers and one or more output optical signal(s) created by optical diffraction through and/or optical reflection from the plurality of optically transmissive and/or reflective substrate layers; one or more optical sensors configured to capture the one or more output optical signal(s) resulting from the plurality of optically transmissive and/or reflective substrate layers; and wherein the plurality of optically transmissive and/or reflective substrate layers are designed during a training phase to define the plurality of physical features formed on or within the plurality of optically transmissive or reflective substrate layers such that the one or more output optical signal(s) are substantially invariant to object or signal transformations comprising one or more of lateral translation, rotation, and/or scaling.

In another embodiment, a method of forming a multilayer optical neural network for processing an input object image or input optical signal that is invariant or partially invariant to object transformations includes: training a software-based neural network to perform one or more specific optical functions for a multi-layer transmissive and/or reflective network having a plurality of optically diffractive physical features located in different locations in each of the layers of the transmissive and/or reflective network, wherein the training comprises feeding a plurality of different input object images or input optical signals that have random transformations or shifts to the software-based neural network and computing at least one optical output of optical transmission and/or reflection through the multi-layer transmissive and/or reflective network using an optical wave propagation model and iteratively adjusting transmission/reflection coefficients for each layer of the multi-layer transmissive and/or reflective network until optimized transmission/reflection coefficients are obtained or a certain time or epochs have elapsed; and manufacturing or having manufactured a physical embodiment of the multi-layer transmissive and/or reflective network comprising a plurality of substrate layers having physical features that match the optimized transmission/reflection coefficients obtained by the trained neural network.

BRIEF DESCRIPTION OF THE DRAWINGS

(FIG. 10B) the shift-invariant design trained with $\Delta_{tr}$=8.48λ; (FIG. 10C) the scale-invariant design trained with $\zeta_{tr}$=0.4; (FIG. the rotation-invariant design trained with $\theta_{tr}$=20°.

FIG. 12A shows the comparison between the inference accuracies of standard (solid curves) and differential (dashed curves) diffractive optical networks trained using various $\Delta_{tr}$ values.

FIG. 13A illustrates randomly scaled object examples from the MNIST test dataset. The frame around each object demonstrates the size of the diffractive layers. FIG. 13B shows the blind inference accuracies provided by five different D$^2$NN models trained with $\zeta$=$\zeta_{tr}$, taken as 0.0, 0.1, 0.2, 0.4, and 0.8; the resulting models were tested under different levels random object scaling with the parameter, $\zeta$=$\zeta_{test}$, swept from 0.0 to 0.8. FIG. 13C shows the classification performance of the diffractive neural networks in (FIG. 13B) for the case of expansion-only (solid curves) and shrinkage-only (dashed curves).

FIG. 14A shows randomly rotated object examples from the MNIST test dataset. The frame around each object demonstrates the size of the diffractive layers. FIG. 14B illustrates the blind inference accuracies provided by five different diffractive neural network models trained with $\theta$=$\theta_{tr}$, taken as 0°, 5°, 10°, 20°, 30° and 60° when they were tested under different levels of random object rotations with the parameter, $\theta$=$\theta_{test}$, swept from 0° to 60°, covering both clockwise and counter-clockwise image rotations.

FIG. 15 illustrates a table showing the blind inference accuracy of the D$^2$NN models trained against the combinations of the three object field transformations investigated in this work: (upper) shift-rotation, (middle) shift-scaling, (lower) rotation-scaling.

(FIG. 16B) $\Delta_{tr}$=2.12λ, $\zeta_{tr}$=0.4; (FIG. 16C) $\theta_{tr}$=10°, $\zeta_{tr}$=0.4.

FIGS. 17A-17C illustrate the confusion matrices achieved by the diffractive neural network designs shown in FIGS. 16A-16C. (FIG. 17A) $\Delta_{tr}$=$\Delta_{test}$=2.12λ, $\theta_{tr}$=$\theta_{test}$=10°; (FIG. 17B) $\Delta_{tr}$=$\Delta_{test}$=2.12λ, $\zeta_{tr}$=$\zeta_{test}$=0.4; (FIG. 17C) $\theta_{tr}$=$\theta_{test}$=10°, $\zeta_{tr}$=$\zeta_{test}$=0.4.

DETAILED DESCRIPTION OF ILLUSTRATED EMBODIMENTS

Figure 1:
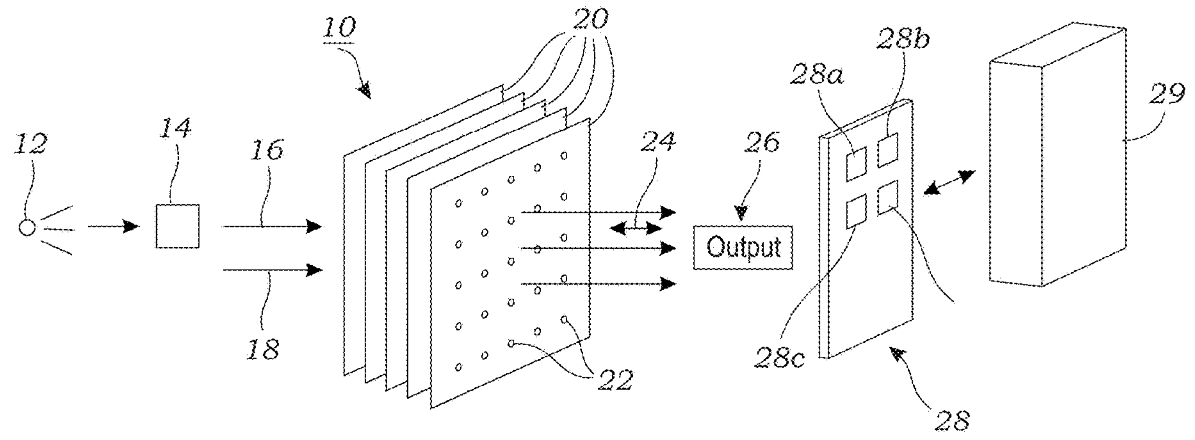
FIG. 1 schematically illustrates one embodiment of an optical neural network that is used in transmission mode according to one embodiment. A source of light directs light on or through an object and into the optical neural network (or an optical signal). In this mode, light passes through the individual substrate layers that form the optical neural network. The light that passes through the optical neural network forms one or more output signals that is/are detected by one or more optical sensors.

FIG. 1 schematically illustrates one embodiment of an optical neural network 10 (sometimes also referred to as a D$^2$NN) that is used in transmission mode according to one embodiment. A light source 12 directs light onto an object 14 (either transmission mode or reflection mode as explained herein in more detail) and the object image 16 is input into the optical neural network 10 that contains a plurality of substrate layers 20 (also sometimes referred to herein as diffractive layers). As an alternative to an object image 16, an optical input signal 18 is input to the optical neural network 10. The optical input signal 18 that is input to the optical neural network 10 may not need either an object 14 or a light source 12. For example, the optical input signal 18 may include, for example, a telecommunications optical signal (e.g., optical signal carried by an optical fiber).

The optical neural network 10 contains a plurality of substrate layers 20 that are physical layers which may be formed as a physical substrate or matrix of optically transmissive material (for transmission mode) or optically reflective material (for reflective mode one). In transmission mode light or radiation passes through the substrate layers 20. Conversely, in reflective mode, light or radiation reflects off the substrate layer(s) 20. Exemplary materials that may be used for the substrate layers 20 include polymers and plastics (e.g., those used in additive manufacturing techniques such as 3D printing) as well as semiconductor-based materials (e.g., silicon and oxides thereof, gallium arsenide and oxides thereof), crystalline materials or amorphous materials such as glass and combinations of the same. Metal coated materials may be used for reflective substrate layers 20. Light may emit directly from a light source 12 and proceed directly into the optical neural network 10. Alternatively, light from the light source 12 may pass through and/or reflect off an object 14, medium, or the like prior entering the optical neural network 10. When a light source 12 is used as part of the optical neural network 10, the light source 12 may be artificial (e.g., light bulb, laser, light emitting diodes, laser diodes, etc.) or the light source 12 may include natural light such as sunlight.

Figure 2:
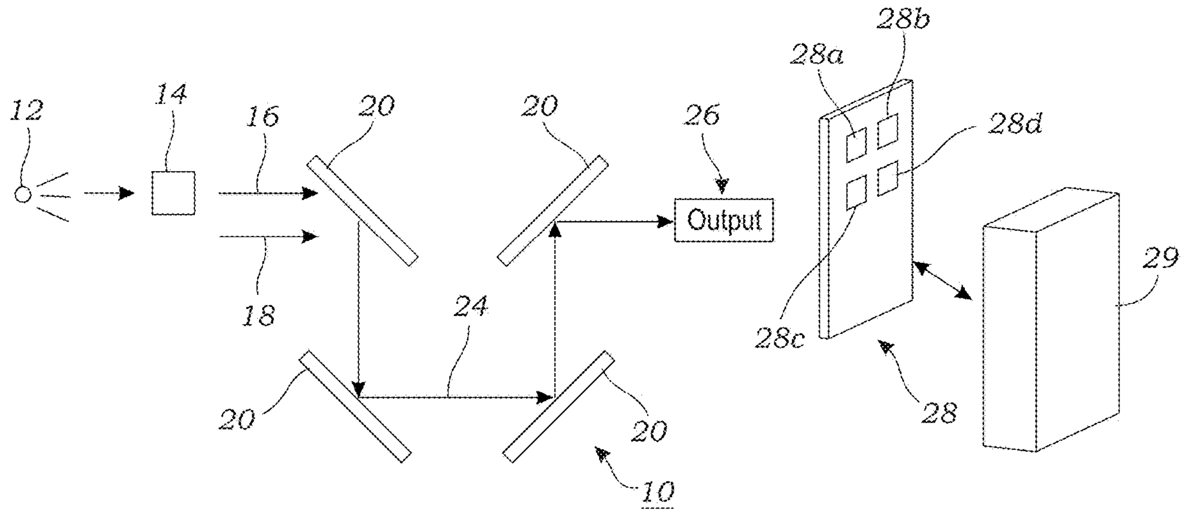
FIG. 2 schematically illustrates another embodiment of an optical neural network that is used in reflection mode according to one embodiment. In this mode, light reflects off the individual substrate layers that form the optical neural network. The reflected light from the optical neural network forms one or more output signals that is/are detected by one or more optical sensors.

With reference to FIGS. 3-6, each substrate layer 20 of the optical neural network has a plurality of physical features 22 formed on the surface of the substrate layer 20 or within the substrate layer 20 itself that collectively define a pattern of physical locations along the length and width of each substrate layer 20 that have varied transmission coefficients (or varied reflection coefficients for the embodiment of FIG. 2). The physical features 22 formed on or in the substrate layers 20 thus create a pattern of physical locations within the substrate layers 20 that have different valued transmission coefficients as a function of lateral coordinates (e.g., length and width and in some embodiments depth) across each substrate layer 20. In some embodiments, each separate physical feature 22 may define a discrete physical location on the substrate layer 20 while in other embodiments, multiple physical features 22 may combine or collectively define a physical region with a particular transmission (or reflection) coefficient. The plurality of substrate layers 20 arranged along the optical path 24 (FIG. 1) collectively define a trained mapping function between the input optical image 16 or optical signal 18 input to the plurality of substrate layers 20 and one or more output optical signal(s) 26 created by optical diffraction through/off the plurality of substrate layers 20. As explained herein, the mapping function is such that the one or more output optical signal(s) 26 is/are substantially invariant to input object (or signal) translation, rotation, and/or scaling, or other object/optical aberrations. Substantially invariant encompasses both fully invariant or partially invariant conditions.

Figure 3:
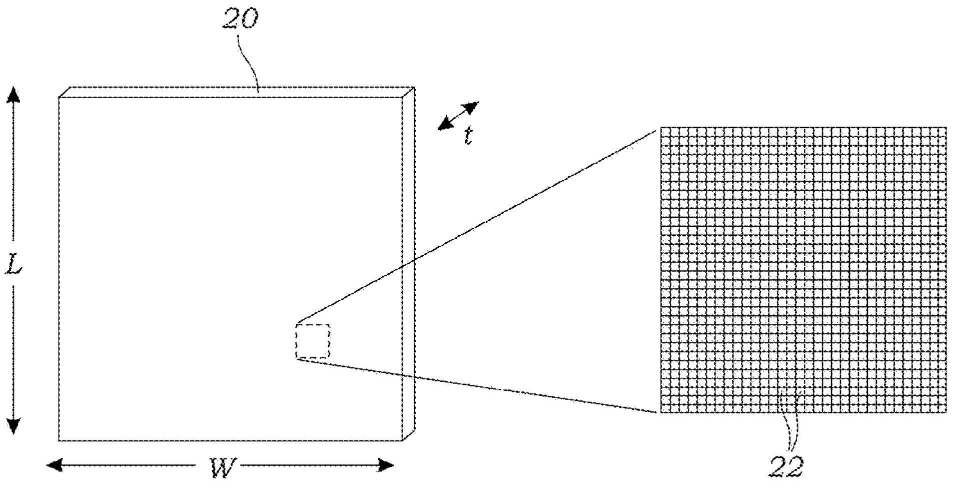
FIG. 3 illustrates a single substrate layer of an optical neural network. The substrate layer may be made from a material that is optically transmissive (for transmission mode such as illustrated in FIG. 1) or an optically reflective material (for reflective mode as illustrated in FIG. 2). The substrate layer, which may be formed as a substrate or plate in some embodiments, has surface features formed across the substrate layer. The surface features form a patterned surface (e.g., an array) having different valued transmission (or reflection) coefficients as a function of lateral coordinates across each substrate layer. These surface features act as artificial "neurons" that connect to other "neurons" of other substrate layers of the optical neural network through optical diffraction (or reflection) and alter the phase and/or amplitude of the light wave.

The pattern of physical locations formed by the physical features 22 may define, in some embodiments, an array located across the surface of the substrate layer 20. With reference to FIG. 3, the substrate layer 20 in one embodiment is a two-dimensional generally planer substrate having a length (L), width (W), and thickness (t) that all may vary depending on the particular application. In other embodiments, the substrate layer 20 may be non-planer such as, for example, curved. In addition, while FIG. 3 illustrates a rectangular or square-shaped substrate layer 20 different geometries are contemplated. With reference to FIG. 1 and FIG. 3, the physical features 22 and the physical regions formed thereby act as artificial "neurons" that connect to other "neurons" of other substrate layers 20 of the optical neural network 10 (as seen, for example, in FIGS. 1 and 2) through optical diffraction (or reflection in the case of the embodiment of FIG. 2) and alter the phase and/or amplitude of the light wave. The particular number and density of the physical features 22 or artificial neurons that are formed in each substrate layer 20 may vary depending on the type of application. In some embodiments, the total number of artificial neurons may only need to be in the hundreds or thousands while in other embodiments, hundreds of thousands or millions of neurons or more may be used. Likewise, the number of substrate layers 20 that are used in a particular optical neural network 10 may vary although it typically ranges from at least two substrate layers 20 to less than ten substrate layers 20.

As seen in FIG. 1, the one or more output optical signal(s) 26 is/are captured by one or more optical sensors 28 (e.g., detectors). The optical sensor 28 may include, for example, an image sensor (e.g., CMOS image sensor or image chip such as CCD), photodetectors (e.g., photodiode such as avalanche photodiode detector (APD)), photomultiplier (PMT) device, and the like. With reference to FIGS. 1 and 2, there are multiple optical sensors **28*a*, 28*b*, 28*c*, 28*d*. These may be discrete optical sensors 28 or they may even be certain pixels on a larger array such as CMOS image sensor that act as individual sensors. The one or more optical sensors 28 may, in some embodiments, be coupled to a computing device 29 as seen in FIGS. 1 and 2 (e.g., a computer or the like such as a personal computer, laptop, server, mobile computing device) that is used to acquire, store, process, manipulate, analyze, and/or transfer the one or more output optical signal(s) 26. In other embodiments, the optical sensor(s) 28 may be integrated within a device such as a camera that is configured to acquire, store, process, manipulate, analyze, and/or transfer the one or more output optical signal(s) 26. In some embodiments, each optical sensor 28 may be associated with an aperture. An opaque layer having one or more apertures (not shown) formed therein may be interposed between the last of the substrate layers 20 and the sensor(s) 28. In some embodiments, each optical sensor 28 may correspond to a particular classification of the object or optical signal. For example, optical sensor 28*a* may correspond to the object being a human face (and thus the input image having a human face). In other embodiments, a pair or grouping of optical sensors 28** may be associated with a particular classification and a differential signal is looked at. An example of such differential detection may be found in Li et al., Class-specific differential detection in diffractive optical neural networks improves inference accuracy, Advanced Photonics, 1(4), 046001 (2019), which is incorporated herein by reference.

FIG. 2 schematically illustrates one embodiment of an optical neural network 10 that is used in reflection mode. Similar components and features shared with the embodiment of FIG. 1 are labeled similarly. In this embodiment, the object 14 is illuminated with light from the light source 12 as described previously to generate an input optical image 16. Of course, this may also be an input optical signal 18 which is also illustrated in FIG. 2. This input object image 16 or optical signal 18 is input to the optical neural network 10. In this embodiment, the optical neural network 10 operates in reflection mode whereby light is reflected by a plurality of substrate layers 20. As seen in the embodiment of FIG. 2, the optical path 24 is a folded optical path as a result of the reflections off the plurality of substrate layers 20. The number of substrate layers 20 may vary depending on the particular function or task that is to be performed as noted above. Each substrate layer 20 of the optical neural network 10 has a plurality of physical features 22 formed on the surface of the substrate layer 20 or within the substrate layer 20 itself that collectively define a pattern of physical locations along the length and width of each substrate layer 20 that have varied reflection coefficients. Like the FIG. 1 embodiment, the one or more output optical signal(s) 26 is captured by one or more optical sensors 28. The one or more optical sensors 28 may be coupled to a computing device 29 as noted or integrated into a device such as a camera.

While FIG. 2 illustrates an embodiment of an optical neural network 10 that functions in reflection mode, it should be appreciated that in other embodiments the optical neural network 10 is a hybrid that includes aspects of a transmission mode of FIG. 1 and the reflection mode of FIG. 2. In this hybrid embodiment, the light from the object image 16 or optical signal 18 transmits through one or more substrate layers 20 and also reflects off one or more substrate layers 20.

Figure 4:
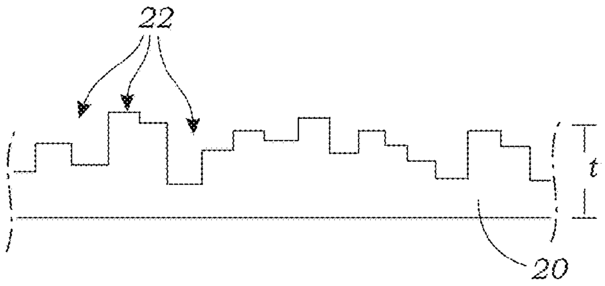
FIG. 4 schematically illustrates a cross-sectional view of a single substrate layer of an optical neural network according to one embodiment. In this embodiment, the surface features are formed by adjusting the thickness of the substrate layer that forms the optical neural network. These different thicknesses may define peaks and valleys in the substrate layer that act as the artificial "neurons."

FIG. 4 illustrates one embodiment of how different physical features 22 are formed in the substrate layer 20. In this embodiment, a substrate layer 20 has different thicknesses (t) of material at different lateral locations along the substrate layer 20. In one embodiment, the different thicknesses (t) modulates the phase of the light passing through the substrate layer 20. This type of physical feature 22 may be used, for instance, in the transmission mode embodiment of FIG. 1. The different thicknesses of material in the substrate layer 20 forms a plurality of discrete "peaks" and "valleys" that control the transmission coefficient of the neurons formed in the substrate layer 20. The different thicknesses of the substrate layer 20 may be formed using additive manufacturing techniques (e.g., 3D printing) or lithographic methods utilized in semiconductor processing. For example, the design of the substrate layers 20 may be stored in a stereolithographic file format (e.g., .stl file format) which is then used to 3D print the substrate layers 20. Other manufacturing techniques include well-known wet and dry etching processes that can form very small lithographic features on a substrate layer 20. Lithographic methods may be used to form very small and dense physical features 22 on the substrate layer 20 which may be used with shorter wavelengths of the light. As seen in FIG. 4, in this embodiment, the physical features 22 are fixed in permanent state (i.e., the surface profile is established and remains the same once complete).

Figure 5:
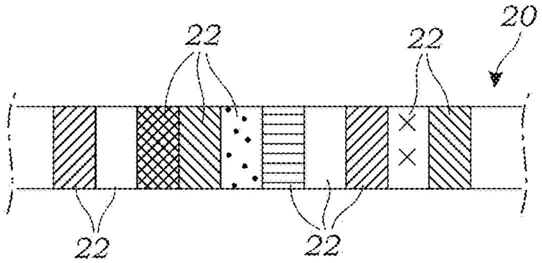
FIG. 5 schematically illustrates a cross-sectional view of a single substrate layer of an optical neural network according to another embodiment. In this embodiment, the different surface features are formed by altering the material composition or material properties of the single substrate layer at different lateral locations across the substrate layer. This may be accomplished by doping the substrate layer with a dopant or incorporating other optical materials into the substrate layer. Metamaterials or plasmonic structures may also be incorporated into the substrate layer.

FIG. 5 illustrates another embodiment in which the physical features 22 are created or formed within the substrate layer 18. In this embodiment, the substrate layer 20 may have a substantially uniform thickness but have different regions of the substrate layer 20 have different optical properties. For example, the refractive (or reflective) index of the substrate layers 20 may altered by doping the substrate layers 20 with a dopant (e.g., ions or the like) to form the regions of neurons in the substrate layers 20 with controlled transmission properties (or absorption and/or spectral features). In still other embodiments, optical nonlinearity can be incorporated into the deep optical network design using various optical non-linear materials (e.g., crystals, polymers, semiconductor materials, doped glasses, polymers, organic materials, semiconductors, graphene, quantum dots, carbon nanotubes, and the like) that are incorporated into the substrate layer 20. A masking layer or coating that partially transmits or partially blocks light in different lateral locations on the substrate layer 20 may also be used to form the neurons on the substrate layers 20.

Alternatively, the transmission function of the physical features 22 or neurons can also be engineered by using metamaterial or plasmonic structures. Combinations of all these techniques may also be used. In other embodiments, non-passive components may be incorporated in into the substrate layers 20 such as spatial light modulators (SLMs). SLMs are devices that imposes spatial varying modulation of the phase, amplitude, or polarization of a light. SLMs may include optically addressed SLMs and electrically addressed SLM. Electric SLMs include liquid crystal-based technologies that are switched by using thin-film transistors (for transmission applications) or silicon backplanes (for reflective applications). Another example of an electric SLM includes magneto-optic devices that use pixelated crystals of aluminum garnet switched by an array of magnetic coils using the magneto-optical effect. Additional electronic SLMs include devices that use nanofabricated deformable or moveable mirrors that are electrostatically controlled to selectively deflect light.

Figure 6:
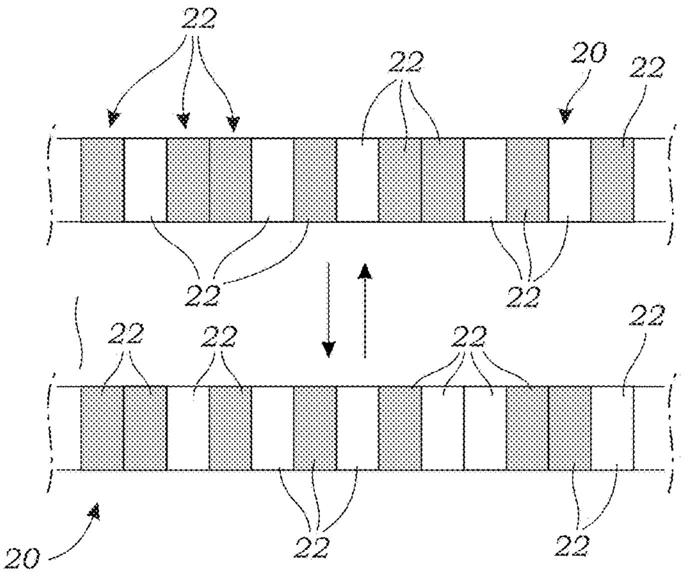
FIG. 6 schematically illustrates a cross-sectional view of a single substrate layer of an optical neural network according to another embodiment. In this embodiment, the substrate layer is reconfigurable in that the optical properties of the various artificial neurons may be changed, for example, by application of a stimulus (e.g., electrical current or field). An example includes spatial light modulators (SLMs) which can change their optical properties. In this embodiment, the neuronal structure is not fixed and can be dynamically changed or tuned as appropriate. This embodiment, for example, can provide a learning optical neural network or a changeable optical neural network that can be altered on-the-fly (e.g., over time) to improve the performance, compensate for aberrations, or even change another task.

FIG. 6 schematically illustrates a cross-sectional view of a single substrate layer 20 of an optical neural network 10 according to another embodiment. In this embodiment, the substrate layer 20 is reconfigurable in that the optical properties of the various physical features 22 that form the artificial neurons may be changed, for example, by application of a stimulus (e.g., electrical current or field). An example includes spatial light modulators (SLMs) discussed above which can change their optical properties. In other embodiments, the layers may use the DC electro-optic effect to introduce optical nonlinearity into the substrate layers 20 of an optical neural network 10 and require a DC electric-field for each substrate layer 20 of the optical neural network 10. This electric-field (or electric current) can be externally applied to each substrate layer 20 of the optical neural network 10. Alternatively, one can also use poled materials with very strong built-in electric fields as part of the material (e.g., poled crystals or glasses). In this embodiment, the neuronal structure is not fixed and can be dynamically changed or tuned as appropriate (i.e., changed on demand). This embodiment, for example, can provide a learning optical neural network 10 or a changeable optical neural network 10 that can be altered on-the-fly to improve the performance, compensate for aberrations, or even change another task.

The optical neural network 10 described herein may perform a number of functions or operations on the input object image 16 or optical signal 18. For example, in one embodiment, the optical neural network 10 is used to classify the object 14 or the optical signal 18. For example, the object 14 may be a car and an image of the car is input to the optical neural network 10 which then classifies the input object image 16 as a car based on the output signal(s) 26 detected using the optical sensors 26. The optical neural network 10 may also be used for detection instead of classification. This may include detecting the presence of a particular object image 16 or optical signal 18. In this regard, the optical neural network 10 may be used to scan or view large numbers of object images 16 and/or optical signals 18 and can detect when a particular target object image 16 or optical signal 18 is detected based on the output optical signal 26 from the optical neural network 10.

Figure 7:
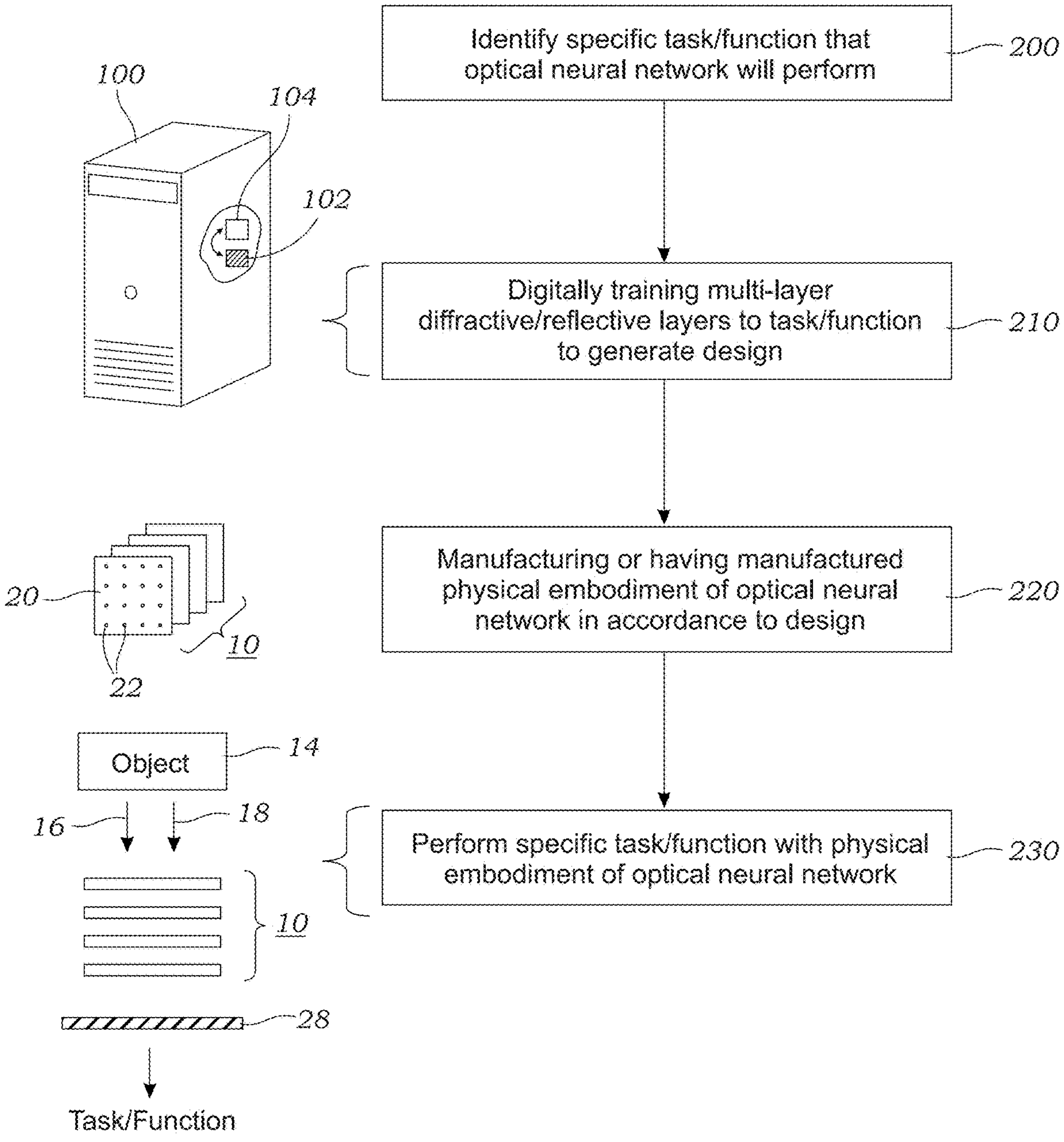
FIG. 7 illustrates a flowchart of the operations according to one embodiment to create and use an optical neural network.

FIG. 7 illustrates a flowchart of the operations or processes according to one embodiment to create and use the optical neural network 10 of the type disclosed herein. As seen in operation 200 of FIG. 7, a specific task/function is first identified that the optical neural network 10 will perform. This may include, for example, classification of an object 14 or the detection of an object 14 in an object image 16 as explained herein. Once the task or function has been established, a computing device 100 having one or more processors 102 executes software 104 to then digitally train a model or mathematical representation of multi-layer diffractive and/or reflective substrate layers 20 used within the optical neural network to the desired task or function to then generate a design for a physical embodiment of the optical neural network 10. This digital training operation is illustrated as operation 210 in FIG. 7. This training establishes the particular transmission/reflection properties of the physical features 22 and/or neurons formed in the substrate layers 20 to accomplish the desired task or function. As explained herein, this training involves using random transformations or shifts in the object images or signal optical inputs during the training of the digital model. The transformations include one or more of lateral translation, rotation, and/or scaling. An optical neural network 10 that corrects or mitigates these transformations is thus designed.

Next, using the established model and design for the physical embodiment of the optical neural network 10, the actual substrate layers 20 used in the physical optical neural network 10 are then manufactured in accordance with the model or design (operation 220). The design, in some embodiments, may be embodied in a software format (e.g., SolidWorks, AutoCAD, Inventor, or other computer-aided design (CAD) program or lithographic software program) and may then be manufactured into a physical embodiment that includes the plurality of substrate layers 20 having the tailored physical features 22 formed therein/thereon. The physical substrate layers 20, once manufactured may be mounted or disposed in a holder 30 such as that illustrated in FIG. 8. The holder 30 may include a number of slots 32 formed therein to hold the individual substrate layers 20 in the required sequence and with the required spacing between adjacent layers (if needed). Once the physical embodiment of the optical neural network 10 has been made, the optical neural network 10 is then used to perform the specific task or function as illustrated in operation 230 of FIG. 7.

Figure 8:
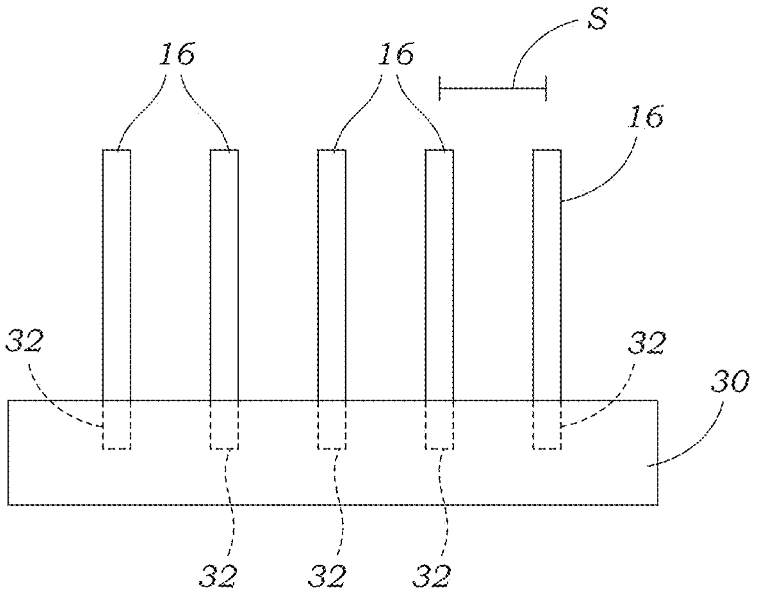
FIG. 8 illustrates an embodiment of a holder that is used to secure the substrate layers used in an optical neural network.

As noted above, the particular spacing of the substrates 20 that make the optical neural network 10 may be maintained using the holder 30 of FIG. 8. The holder 30 may contact one or more peripheral surfaces of the substrate layers 16. In some embodiments, the holder 30 may contain a number of slots 32 that provide the ability of the user to adjust the spacing (S) between adjacent substrate layers 20. In some embodiments, the substrate layers may be permanently secured to the holder 30 while in other embodiments, the substrate layers 20 may be removable from the holder 30. The plurality of substrate layers 20 may be positioned within and/or surrounded by vacuum, air, a gas, a liquid, or a solid material. Importantly, the physical optical neural network 10 is invariant or partially invariant to object or signal transformations due to the training of the optical neural network model as described herein. Thus, the physical optical neural network 10 will still perform well even if there are slight perturbations or changes in the input optical image or signal introduced into the optical neural network 10. For example, the physical optical neural network 10 may be used in an application where physical forces are present that could result in object or signal transformations. Environmental conditions may also create object or signal transformations. The physical optical neural network 10 is able to tolerate these transformations without sacrificing performance of the physical optical neural network 10 (e.g., classification, detection, or other task).

Experimental

Results and Discussion

Figure 9A:
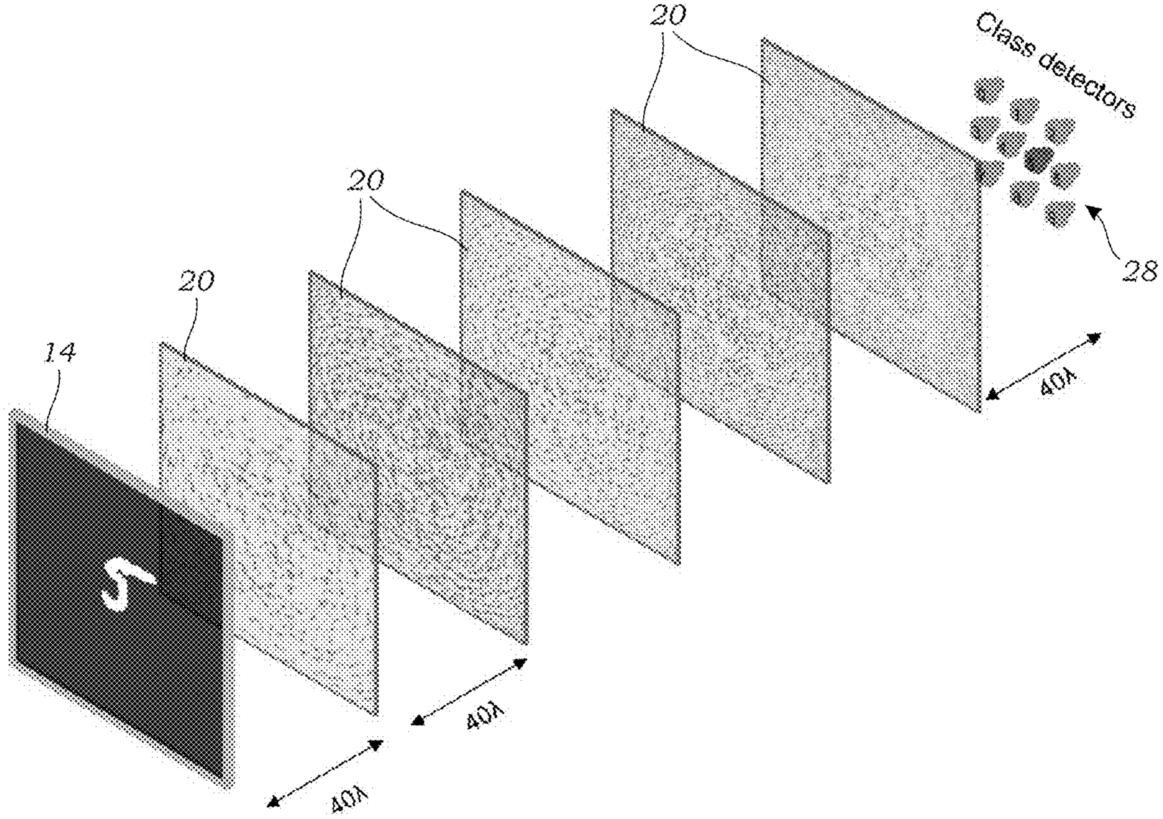
FIG. 9A illustrates the layout of the diffractive optical neural networks trained and tested.

In a standard $D^2$NN-based optical image classifier, the number of optical sensors 28 (e.g., opto-electronic detectors) positioned at the output plane is equal to the number of classes in the target dataset and, each opto-electronic detector 28 uniquely represents one data class (see FIG. 9A). The final class decision is based on the max operation over the collected optical signals by these class detectors 26. According to the diffractive neural network layout illustrated in FIG. 9A, the object image 16 (e.g., handwritten MNIST digits) lie within a pre-defined field-of-view (FOV) of 53.33λ×53.33λ, where λ denotes the wavelength of the illumination light from the light source 12. The center of the FOV coincides with the optical axis 24 passing through the center of the diffractive layers 20. The size of each substrate layer is chosen to be 106.66λ×106.66λ, i.e., exactly 2× the size of the input FOV on each lateral axis. The smallest diffractive feature size on each $D^2$NN layer is set to be ~0.53λ, i.e., there are 200×200 trainable features on each substrate layer 20 of a given $D^2$NN 10 design. At the output plane, each detector 28 is assumed to cover an area of 6.36λ×6.36λ and they are located within an output FOV of 53.33λ×53.33λ—matching the input FOV size.

Figure 9B:
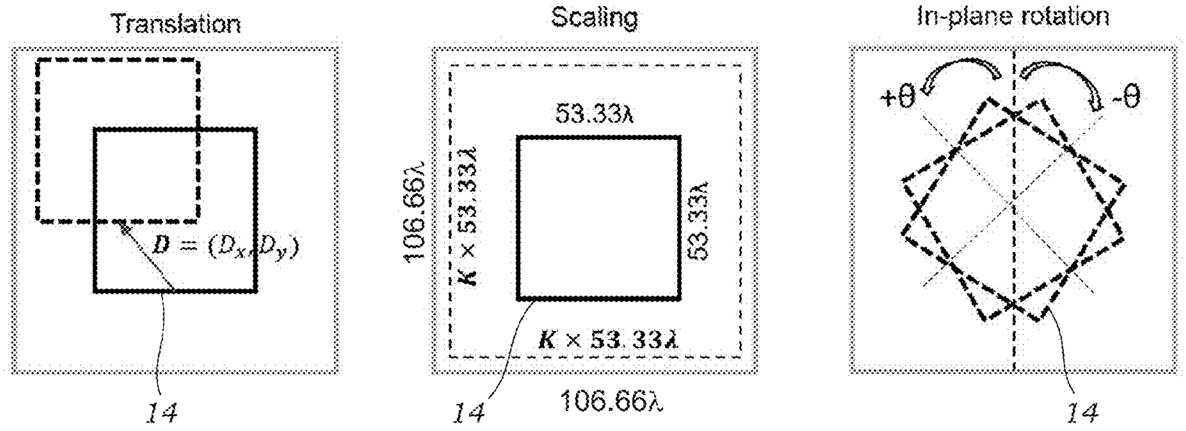
FIG. 9B illustrates the object transformations modeled during the training and testing of the diffractive optical networks presented herein (i.e., translation, scaling, and in-plane rotation).
Figures 10A, 10B, 10C, 10D:
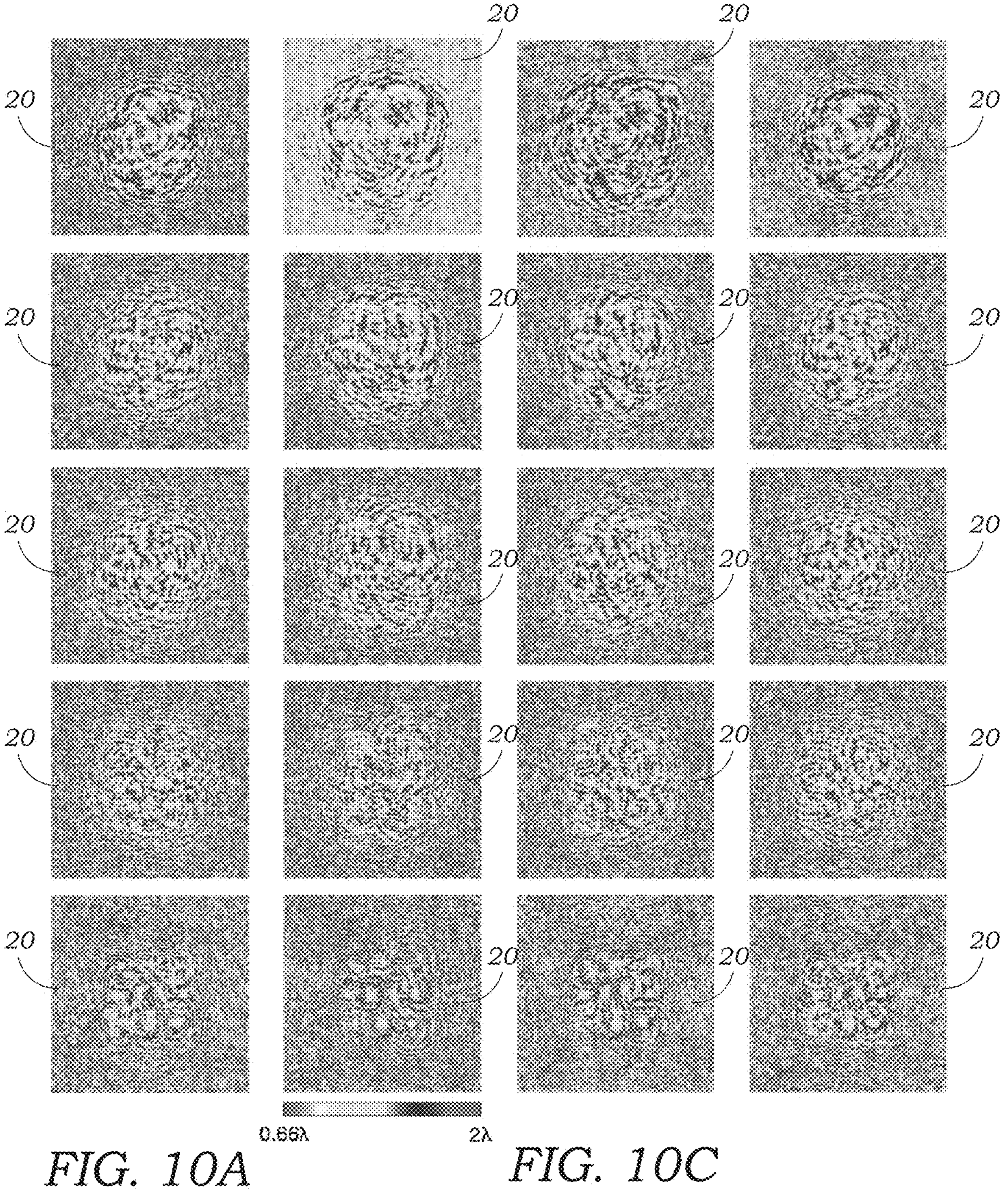
FIGS. 10A-10D illustrate the thickness profiles of the designed diffractive layers constituting (FIG. 10A) the standard design ($\Delta_{tr}$=0)

Based on these design parameters, a 5-layer diffractive optical neural network 10 with phase-only modulation at each neuron achieves a blind testing accuracy of 97.64% for the classification of amplitude-encoded MNIST images illuminated with a uniform plane wave. FIG. 10A illustrates the thickness profiles of the resulting five (5) diffractive layers 10, constituting this standard $D^2$NN design. To quantify the sensitivity of the blind inference accuracy of this $D^2$NN design against uncontrolled lateral object translations, an object displacement vector was introduced (FIG. 9B), $D=(D_x, D_y)$, that has two components, defined as independent, uniformly distributed random variables:

$$D_x \sim U(-\Delta_x, \Delta_x), \tag{1a}$$

$$D_y \sim U(-\Delta_y, \Delta_y). \tag{1b}$$

Figure 11A:
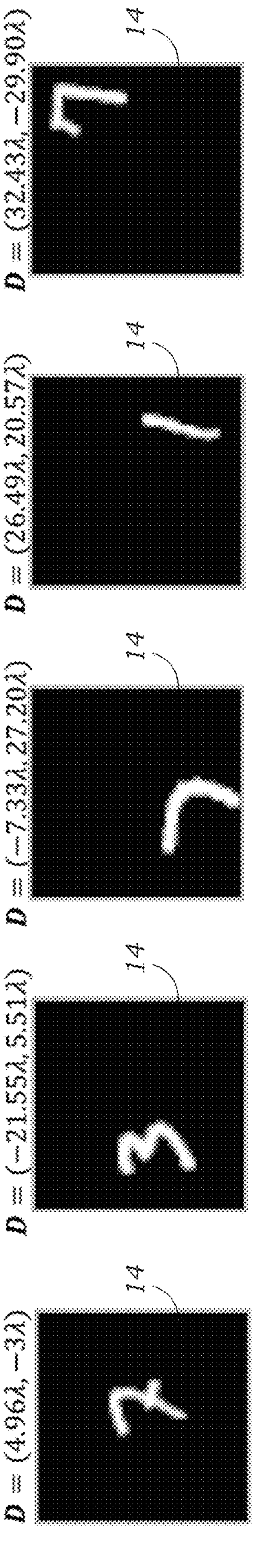
FIG. 11A shows shift-invariant diffractive optical networks and randomly shifted object samples from the MNIST test dataset. Green frame around each object demonstrates the size of the diffractive layers (106.66λ×106.66λ).
Figure 11B:
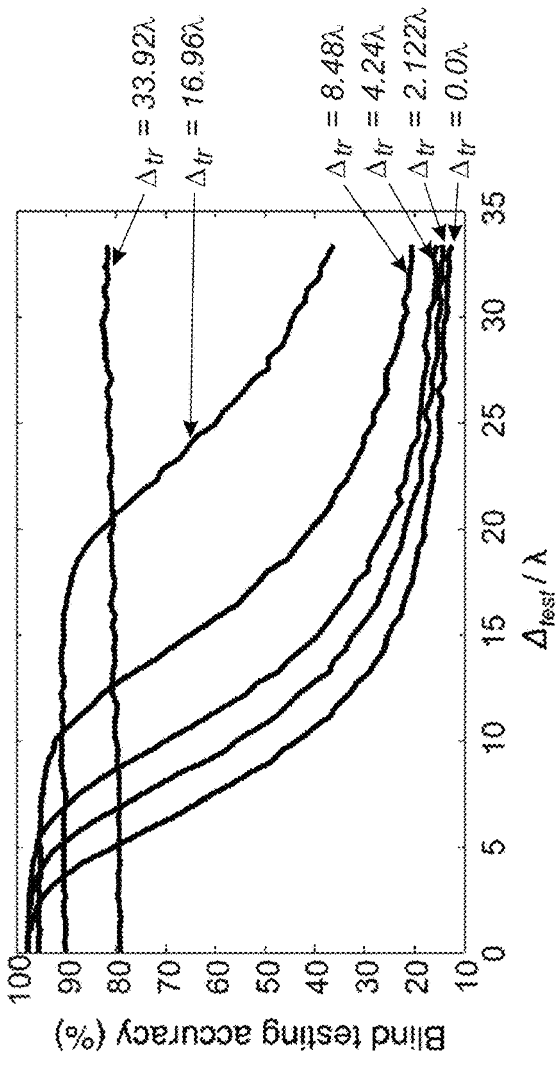
FIG. 11B shows the blind inference accuracies provided by six different diffractive neural network models trained with $\Delta_x$=$\Delta_y$=$\Delta_{tr}$, taken as 0.0λ, 2.12λ, 4.24λ, 8.48λ, 16.96λ, 33.92λ when they were tested under different levels random object shifts with the control parameter, $\Delta_x$=$\Delta_y$=$\Delta_{test}$, swept from 0.0λ to 33.92λ.

The standard diffractive neural network model (shown in FIG. 10A) was trained (tr) with $\Delta_x=\Delta_y=\Delta_{tr}=0$, and was then tested under different levels of input object position shifts by sweeping the values of $\Delta_x=\Delta_y=\Delta_{test}$ from 0 to 33.92λ with steps of 0.53λ. Stated differently, the final test accuracy corresponding to each $\Delta_{test}$ value reflects the image classification performance of the same diffractive neural network model that was tested with 10,000 different object positions randomly chosen within the range set by $\Delta_{test}$ (see FIG. 11A for exemplary test objects 14). This analysis revealed that the blind inference accuracy of the standard $D^2$NN design ($\Delta_{tr}=0$) which achieves 97.64% under $\Delta_{test}=0$ quickly falls below 90% as the input objects 14 starts to move within the range ∓3.5λ(FIG. 11B, defined with $\Delta_{tr}=0$). As the area covered by the possible object shifts is increased further, the inference accuracy of this native network model decreases rapidly (see FIG. 11B).

In this conventional design approach, the optical forward model of the diffractive neural network training assumes that the input objects inside the sample FOV are free-from any type of undesired geometrical variations, i.e., $\Delta_{tr}=0$. Hence, the diffractive layers are not challenged to process optical waves coming from input objects at different spatial locations, possibly overfitting to the assumed FOV location. As a result, the inference performance of the resulting diffractive neural network model becomes dependent on the relative lateral location of the input object with respect to the plane of the substrate layers 20 and the output detectors 26.

To mitigate this problem, a training strategy was adopted whereby each training image sample in a batch is randomly shifted, based on a realization of the displacement vector (D), and subsequently, the loss function is computed by propagating these randomly shifted object fields through the diffractive neural network (see the Methods for details). Using this training scheme, five (5) different diffractive neural network models were designed based on different ranges of object displacement, i.e., $\Delta_x=\Delta_y=\Delta_{tr}$=2.12λ, 4.24λ, 8.48λ, 16.96λ and 33.92λ. (see Eq. 1). FIG. 11B illustrates the MNIST image classification accuracies provided by these five (5) new diffractive neural network models as a function of $\Delta_{test}$. Comparison between the diffractive neural network models trained with $\Delta_{tr}=0$ and $\Delta_{tr}$=2.12λ reveals that due to the data augmentation introduced by the small object shifts during the training, the latter can achieve an improved inference accuracy of 98.00% for MNIST digits under $\Delta_{test}=0$. Furthermore, the diffractive optical neural network 10 trained with $\Delta_{tr}$=2.12λ can maintain its classification performance when the input objects are randomly shifted within a certain lateral range (see the right shift of the $\Delta_{tr}$=2.12λ curve in FIG. 11B). Similarly, training a diffractive neural network model with $\Delta_{tr}$=4.24λ. (FIG. 11B) also results in a better classification accuracy of 97.75% when compared to the 97.64% achieved by the standard model ($\Delta_{tr}=0$) under $\Delta_{test}=0$. In addition, this new diffractive model exhibits further resilience to random shifts of the objects 14 within the input FOV, which is indicated by the stronger right shift of the $\Delta_{tr}$=4.24λ curve in FIG. 11B. For example, for $\Delta_{test}$=3.71λ in FIG. 11B, the input test objects are randomly shifted in x and y by an amount determined by $D_x$~U(−3.71λ, 3.71λ) and $D_y$~U(−3.71λ, 3.71λ), respectively, and this results in a classification accuracy of 97.07% for the new diffractive model ($\Delta_{tr}$=4.24λ), whereas the inference accuracy of the standard model ($\Delta_{tr}=0$) decreases to 89.88% under the same random lateral shifts of the input test objects. Note that the transformation or shift that is randomly used during training may include affine transformations. Alternative transformations like warping and/or other aberrations may also be randomly introduced during the training process.

Further increasing the range of the object location uncertainty, e.g., to $\Delta_{tr}$=8.48λ. (FIG. 11B), one starts to observe a trade-off between the peak inference accuracy and the resilience of the diffractive optical neural network 10 to random object shifts. For instance, the diffractive optical neural network 10 trained with $\Delta_{tr}$=8.48λ can achieve a peak classification accuracy of 95.55%, which represents a ~2% accuracy compromise with respect to the native diffractive neural network model ($\Delta_{tr}$=0) tested under $\Delta_{test}$=0. However, using such a large object location uncertainty in the training phase also results in a rather flat accuracy curve over a much larger test range as shown in FIG. 11B; in other words, this design strategy expands the effective input object FOV that can be utilized for the desired machine learning task. For example, if the test objects 14 were to freely move within the area defined by $\Delta_x=\Delta_y=\Delta_{test}$=6.89λ, the diffractive neural network model trained with $\Delta_{tr}$=8.48λ (FIG. 11B) brings a >30% inference accuracy advantage compared to the standard model ($\Delta_{tr}$=0) curve in FIG. 11B). The resulting substrate layer 20 thickness profiles for this diffractive optical network design trained with $\Delta_{tr}$=8.48λ are also shown in FIG. 10B.

For the case where $\Delta_{tr}$ was set to be 16.96λ, the mean test classification accuracy over the range $0<\Delta_{test}<\Delta_{tr}$ is observed to be 90.46% (FIG. 11B). The relatively more pronounced performance trade-off in this case can be explained based on the increased input FOV. Stated differently, with larger $\Delta_{tr}$ values, the effective input FOV of the diffractive neural network is increased, and the dimensionality of the solution space provided by a diffractive neural network design with a limited number of layers (and neurons) might not be sufficient to provide the desired solution when compared to a smaller input FOV diffractive neural network design. The use of wider substrate layers 20 (i.e., larger number of neurons per layer) can be a strategy to further boost the inference accuracy over larger $\Delta_{tr}$ values (or larger effective input FOVs) (see FIG. 12B).

As an alternative design strategy, the detector plane configuration shown in FIG. 9A can also be replaced with a differential detection scheme to mitigate this relative drop in blind inference accuracy for designs with large $\Delta_{tr}$. In this scheme, instead of assigning a single optoelectronic detector 28 per class, two detectors 28 are designated to each data class and represent the corresponding class scores based on the normalized difference between the optical signals collected by each detector pair 28. This differential detection scheme is disclosed in International Patent Application No. WO2020247828A1, which is incorporated herein by reference.

Figure 12A:
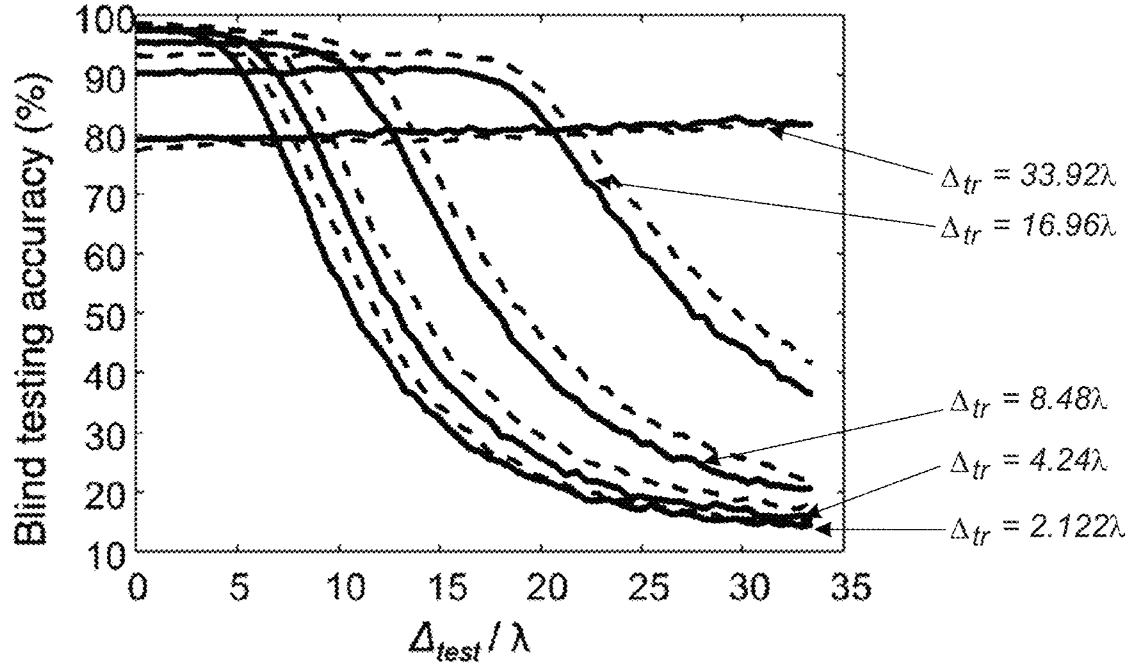
FIG. 12A illustrate how different design strategies can improve the performance of shift-invariant diffractive optical networks.

FIG. 12A illustrates a comparison between the blind classification accuracies of standard (solid curves) and differential (dashed curves) diffractive neural network designs, when they were trained with random lateral shifts of the input objects. For all of these designs, except the $\Delta_{tr}$=33.92λ case, the differential diffractive neural networks 10 achieve higher classification accuracies throughout the entire testing range, showing their superior robustness and adaptability to input field variations compared to their non-differential counterparts. For example, the peak inference accuracy (95.55%) achieved by the diffractive optical network 10 trained with $\Delta_{tr}$=8.482. (FIG. 12A) increases to 97.33% using the differential detection scheme (dashed $\Delta_{tr}$=8.48λ curve in FIG. 12A). As another example, for $\Delta_{tr}$=16.96λ, the mean classification accuracy of the differential diffractive neural network over $0<\Delta_{test}<\Delta_{tr}$ yields 93.38%, which is ~3% higher compared to the performance of its non-differential counterpart for the same test range.

Figure 12B:
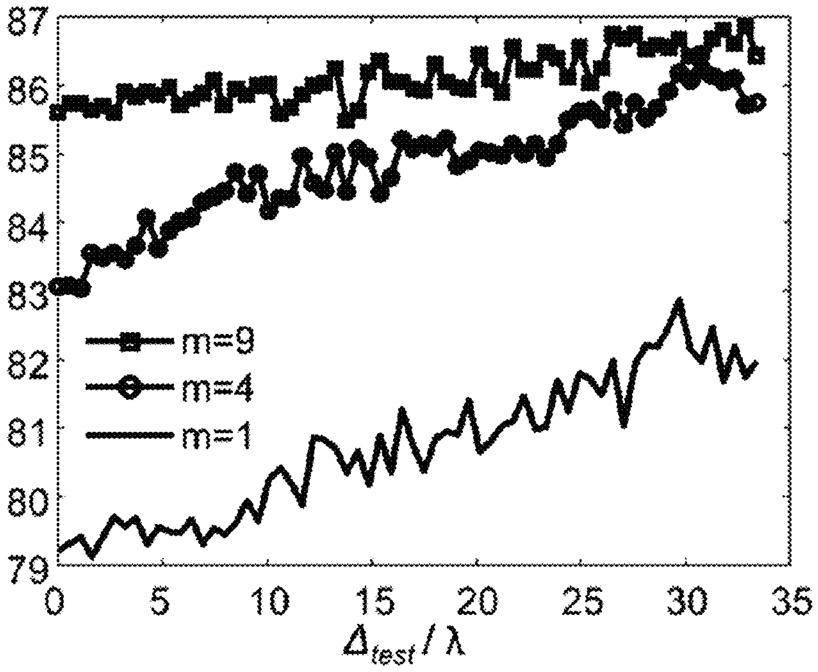
FIG. 12B illustrates blind testing classification accuracies of three non-differential, 5-layer D$^2$NN designs that have m×40K optical neurons per layer, with m=1, 4 and 9. All these diffractive optical networks were trained using $\Delta_{tr}$=33.92λ. The diffractive neural network designs with wider diffractive layers and more neurons per layer can generalize more effectively to random object translations.

On the other hand, enlarging the uncertainty in the input object translation further, e.g., $\Delta_{tr}$=33.922λ, starts to balance out the benefits of using differential detection at the output plane (see the solid and dashed $\Delta_{tr}$=33.92λ curves in FIG. 12A, which closely follow each other). In fact, when $\Delta_x$ and $\Delta_y$ in Eq. 1 are large enough, such as $\Delta_{tr}$=33.92λ, the effective input FOV increases considerably with respect to the size of the diffractive substrate layers 20; as discussed earlier, the use of wider substrate layers 10 with larger numbers of neurons per substrate layer 20 could be used to mitigate this and improve inference performance of D$^2$NN designs that are trained with relatively large $\Delta_{tr}$ values. To shed more light on this, using $\Delta_{tr}$=33.92λ two additional diffractive optical network models were trained with wider diffractive substrate layers 20 that cover m=4 and m=9 fold larger number of neurons per substrate layer 20 compared to the standard design (m=1) that has neurons per diffractive substrate layer 20; stated differently, each diffractive substrate layer 20 of these two new designs contain (2×200)×(2×200)=4×40K and (3×200)×(3×200)=9×40K neurons per layer, covering five (5) diffractive substrate layers 20, same as the standard D$^2$NN design. The comparison of the blind classification accuracies of these 5-layer D$^2$NN designs with m=1, 4 and 9, all trained with $\Delta_{tr}$=33.92λλ, reveals that an increase in the width of the diffractive substrate layers 20 not only increases the input numerical aperture (NA) of the D$^2$NN 10, but also significantly improves the classification accuracies even under large test (see FIG. 12*b*). For example, the D$^2$NN design with $\Delta_{tr}$=33.92λ and m=4 achieves classification accuracies of 83.08% and 85.76% for the testing conditions, $\Delta_{test}$=0.0λ and $\Delta_{test}=\Delta_{tr}$=33.92λ, respectively. With the same $\Delta_{test}$ values, the diffractive neural network with m=1, i.e., 40K neurons per layer can only achieve classification accuracies of 79.23% and 81.98%, respectively. The expansion of the substrate layers 20 to accommodate 9×40K neurons per layer (m=9), further increases the mean classification accuracies over the entire $\Delta_{test}$ range, as illustrated in FIG. 12B.

Figure 13A:
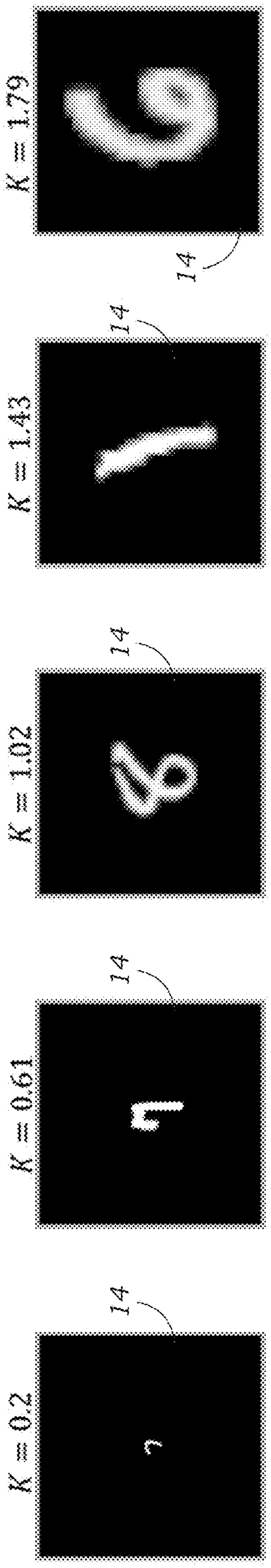
FIGS. 13A-13C illustrate the performance of scale-invariant diffractive optical networks.
Figure 13B:
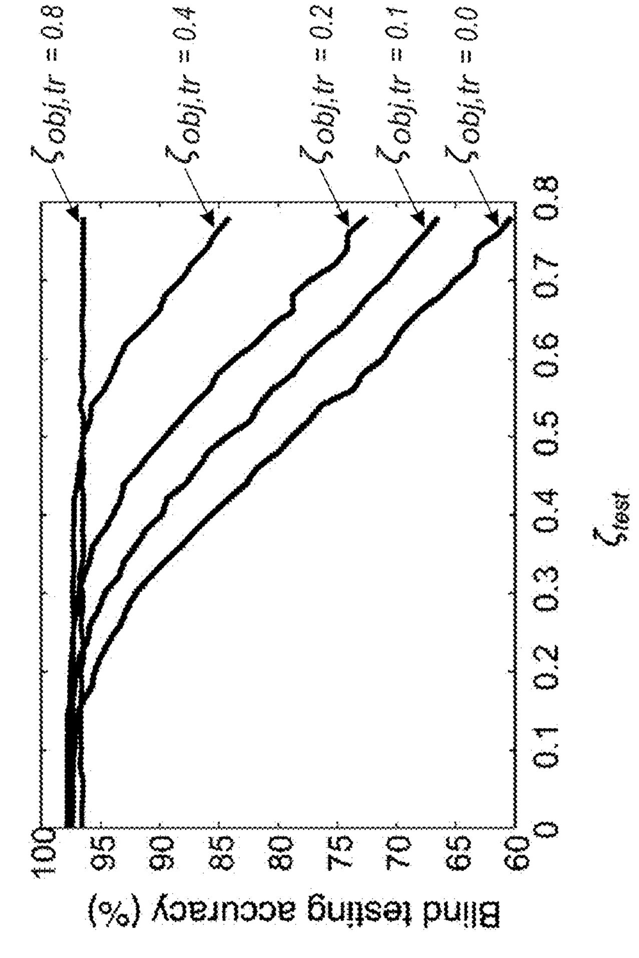

Next, the presented training approach was expanded to design diffractive optical network models that are resilient to the scale of the input objects 14. To this end, similar to Eqs. 1a and 1b, a scaling parameter was defined, K~U(1−ζ, 1+0, randomly covering the scale range (1−ζ, 1+ζ) determined by the hyperparameter, ζ. According to this formulation, for a given value of K, the physical size of the input object 14 is scaled up (K>1) or down (K<1); see FIG. 13A. Based on this formulation, in addition to the standard D$^2$NN design with $\zeta_{tr}$=0, four new diffractive neural network models were trained with $\zeta_{tr}$=0.1, 0.2, 0.4 and 0.8. The resulting diffractive neural network models were then tested by sweeping $\zeta_{test}$ from 0 to 0.8 with steps of 0.02 and for each case, the classification accuracy on testing data attained by each diffractive model was computed (see FIG. 13B). This analysis reveals that the resulting diffractive neural network designs are rather resilient to random scaling of the input objects 14, maintaining a competitive inference performance over a large range of object shrinkage or expansion (FIG. 13B). Similar to the case shown in FIG. 11B, the relatively small values of $\zeta_{tr}$, e.g., 0.1 (FIG. 13B) or 0.2 (FIG. 13B), effectively serve as data augmentation and the corresponding diffractive neural network models achieve higher peak inference accuracies of 97.84% ($\zeta_{tr}$=0.1) and 97.88% ($\zeta_{tr}$=0.2) compared to the 97.64% achieved by the standard design ($\zeta_{tr}$=0). Furthermore, the comparison between the shift- and scale-invariant diffractive optical network models trained with $\Delta_{tr}$=16.962 (FIG. 11B) and $\zeta_{tr}$=0.8 (FIG. 13B) is highly interesting since the effective FOVs induced by these two training parameters at the input/object plane are quite comparable, resulting in ~1.87× and 1.8× of the FOV of the standard design ($\Delta_{tr}=\zeta_{tr}$=0), respectively. Despite these comparable effective FOVs at the input plane, the diffractive neural network trained against random scaling, $\zeta_{tr}$=0.8, achieves nearly ~6% higher inference accuracy compared to the shift-invariant design, $\Delta_{tr}$=16.96λ; in general, lateral random shifts of the input object 14 with respect to a fixed diffractive neural network width seems to lower the inference accuracy of the diffractive models more than random object scaling, which indicates the physical importance of the trainable pixels/neurons within the central region of a diffractive neural network and the effectiveness of their optical communication with the neighboring substrate layers 20. The mean classification accuracy provided by this scale-invariant diffractive optical network model ($\zeta_{tr}$=0.8) over the entire testing range, $0<\zeta_{test}<0.8$, is found to be 96.57% (FIG. 13B), which is only ~1% lower than that of the standard diffractive design tested in the absence of random object scaling ($\zeta_{test}$=0).

Figure 13C:
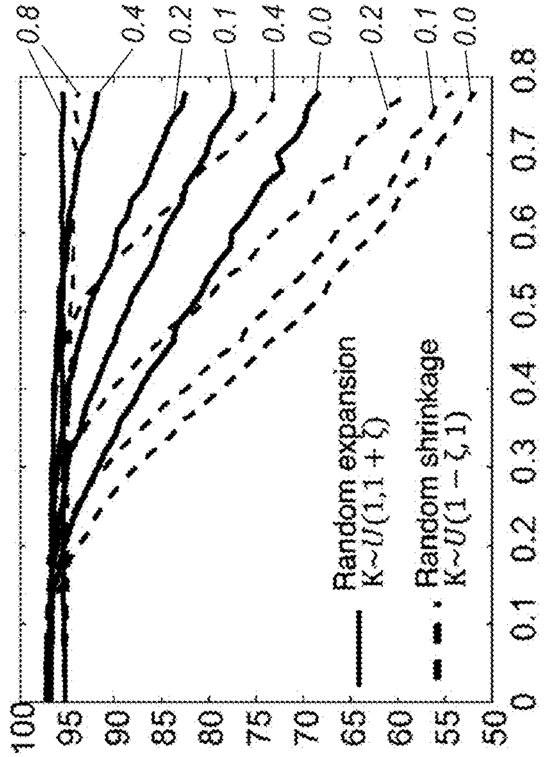

To explore if there is a large performance gap between the classification accuracies attained for de-magnified and magnified input objects 14, next, the diffractive optical network models in FIG. 13B were separately tested for the case of expansion-only, i.e., K~U(1,1+ζ) and shrinkage-only, i.e., K~U(1−ζ, 1); see FIG. 13C. A comparison of the solid (expansion-only) and the dashed (shrinkage-only) curves in FIG. 13C reveals that, in general, diffractive neural networks' resilience toward object expansion and object shrinkage is similar. For instance, for the case of $\zeta_{tr}$=0.4 (FIG. 13C) the mean classification accuracy difference observed between the expansion-only vs. shrinkage-only testing is only 0.04% up to the point that the testing range is equal to that of the training, i.e., $\zeta_{test}=\zeta_{tr}$. Similarly, for $\zeta_{tr}$=0.8 the mean classification accuracy difference observed between the expansion-only vs. shrinkage-only testing is ~0.75%. When analyzing these results reported in FIG. 13C, one should carefully consider the fact that for a fixed choice of ζ parameter there is an inherent asymmetry in expansion and shrinkage percentages; for example, for $\zeta_{test}$=0.8, K can take values in the range (0.2,1.8), where the extreme cases of 0.2 and 1.8 correspond to 5× shrinkage and 1.8× expansion of the input object 14, respectively. Therefore, the curves reported in FIG. 13C for expansion-only vs. shrinkage-only testing naturally contain different percentages of scaling with respect to the original size of the input objects 14.

Figure 14A:
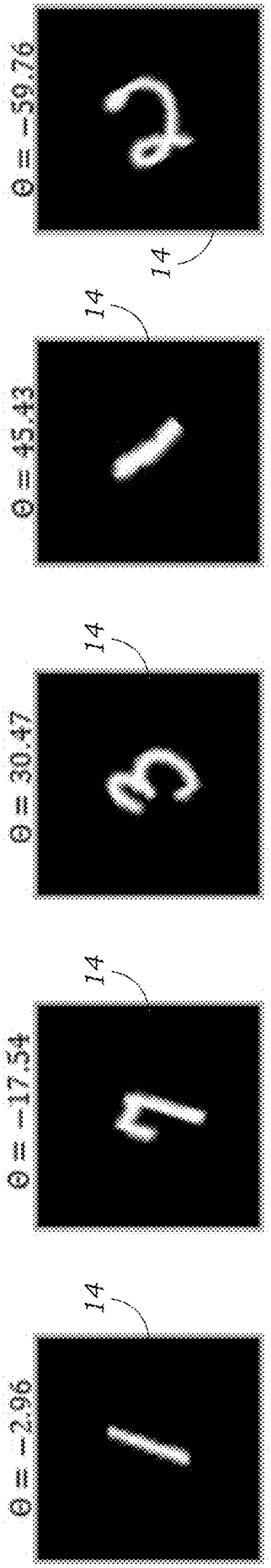
FIGS. 14A-14B illustrate the performance of rotation-invariant diffractive optical networks.
Figure 14B:
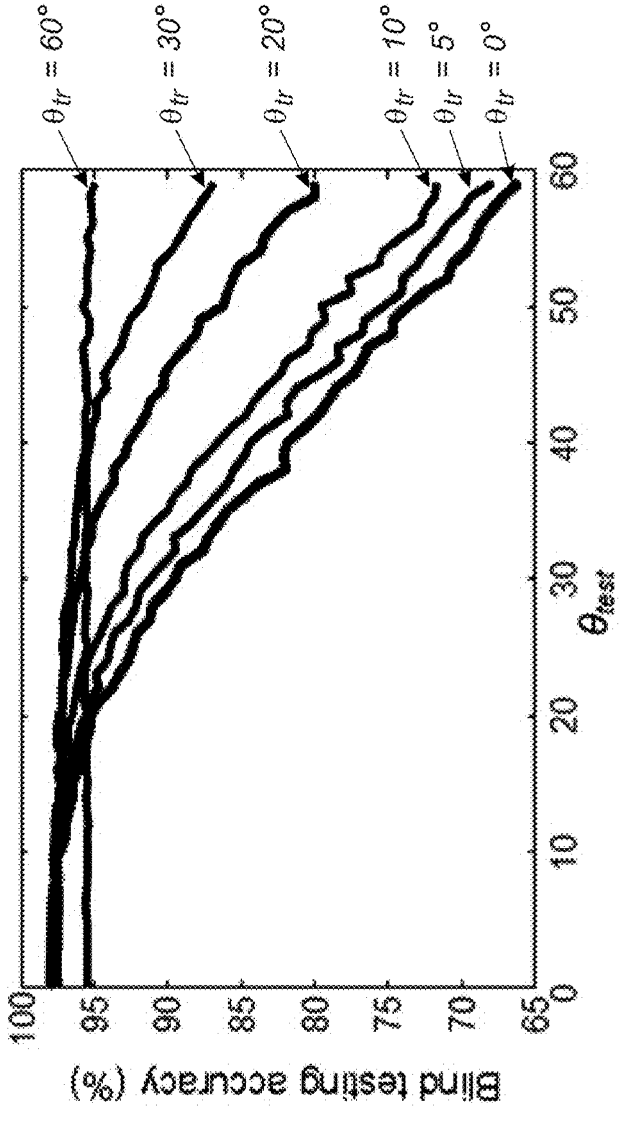

Next, the presented framework was expanded to handle input object rotations. FIGS. 14A and 14B illustrates an equivalent analysis as in FIG. 11B, except that the input objects 14 are now rotating (FIG. 14A), instead of shifting, around the optical axis, according to a uniformly distributed random rotation angle, Θ~U(−θ, θ), where $\iota<0$ and $\Theta>0$ correspond to clockwise and counterclockwise rotation as depicted in FIG. 9B, respectively. In this comparative analysis, six different diffractive neural network models trained with $\theta_{tr}$ values taken as 0° (standard design), 5°, 10°, 20°, 30° and 60° were tested as a function of $\theta_{test}$ taking values between 0° and 60° with a step size of 1°, i.e., Θ~U(−$\theta_{test}$, $\theta_{test}$). Similar to the case of scale-invariant designs reported in FIGS. 13A-13C, these diffractive neural network models trained with different $\theta_{tr}$ values can build up strong resilience against random object rotations, almost without a compromise in their inference. In fact, training with $\theta_{tr}\leq 20°$ (FIG. 14B) improves the peak inference accuracy over the standard design ($\theta_{tr}$=0°). When $\theta_{tr}$=30° (FIG. 14B), the inference of the diffractive optical network is relatively flat as a function of $\theta_{test}$, achieving a classification accuracy of 97.51% and 96.68% for $\theta_{test}$=0° and $\theta_{test}$=30°, respectively, clearly demonstrating the advantages of the presented design framework.

Figure 16A:
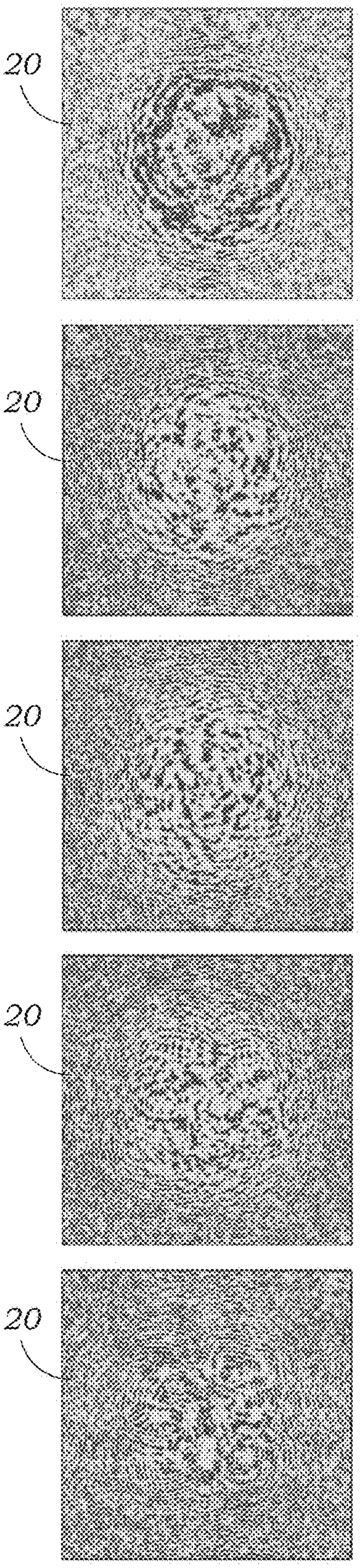
FIGS. 16A-16C illustrates the thickness profiles of the diffractive neural networks reported in the table of FIG. 15 (FIG. 16A) $\Delta_{tr}$=2.122, $\theta_{tr}$=10°.
Figure 16B:
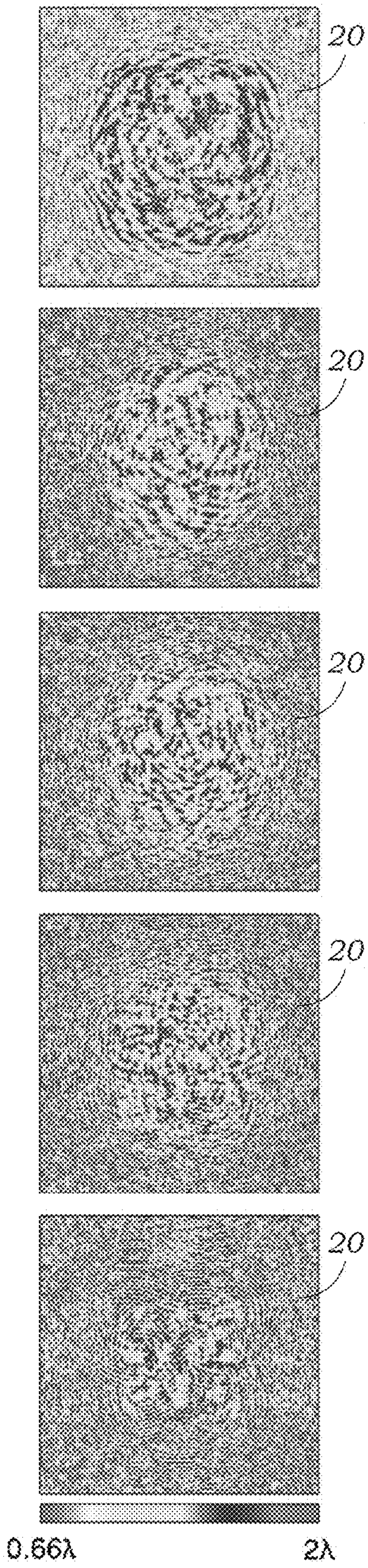
Figure 16C:
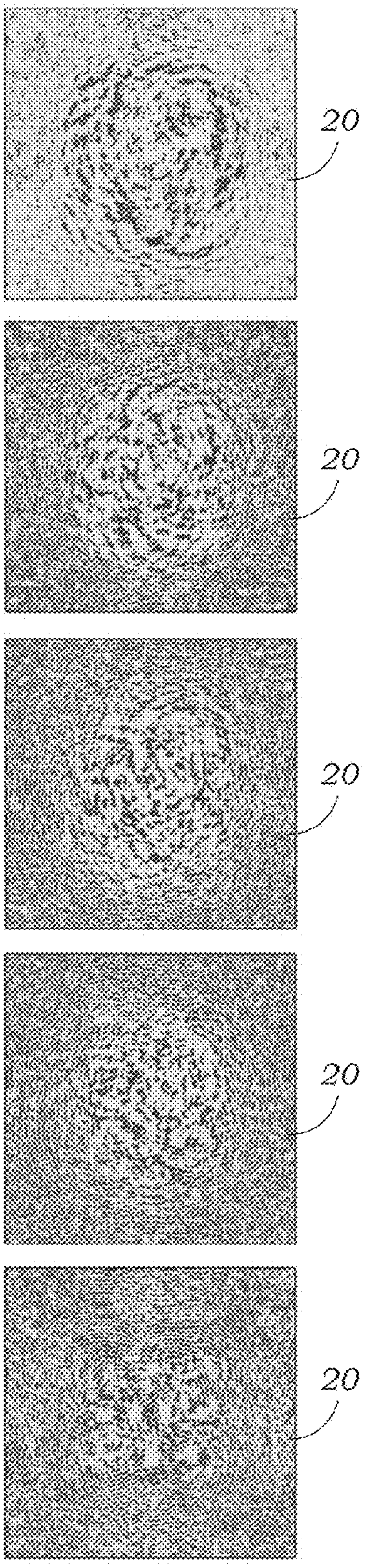

Finally, the design of diffractive optical network models that were trained to simultaneously accommodate two of the three commonly encountered input objects transformations, i.e., random lateral shifting, scaling, and in-plane rotation was investigated. The table in FIG. 15 reports the resulting classification accuracies of these newly trained $D^2$NN models, where the inference performance of the corresponding diffractive optical network was tested with the same level of random object transformation as in the training, i.e., $\Delta_{tr}=\Delta_{test}$, $\zeta_{tr}=\zeta_{test}$, $\theta_{tr}=\theta_{test}$. The results in FIG. 15 reveal that these diffractive neural network designs can maintain their inference accuracies over 90%, building up resilience against unwanted, yet practically-inevitable object transformations and variations. The thickness profile of the substrate layers 20 constituting the $D^2$NN designs trained with the object transformation parameter pairs: ($\Delta_{tr}$=2.12λ, $\theta_{tr}$=10°), ($\Delta_{tr}$=2.12λ, $\zeta_{tr}$=0.4) and ($\theta_{tr}$=10°, $\zeta_{tr}$=0.4) reported in FIG. 15 are illustrated in FIGS. 16A-16C. The confusion matrices provided by these three diffractive neural network models computed under $\Delta_{tr}=\Delta_{test}$, $\zeta_{tr}=\zeta_{test}$, and $\theta_{tr}=\theta_{test}$, are also reported in FIGS. 17A-17C.

The sensitivity of diffractive optical neural networks 10 against three fundamental object transformations (lateral translation, scaling and rotation) that are frequently encountered in various machine vision applications was quantified. Moreover, a new design scheme that formulates these input field transformations through uniformly distributed random variables as part of the training process in the optical forward model has been presented in deep learning-based training of $D^2$NNs. This training strategy significantly increases the robustness of optical neural networks 10 against undesired object field transformations. Although, input object classification was used as the target inference task, the presented ideas and the underlying methods can be extended to other optical machine learning tasks (e.g., monitoring, detection). As the presented training scheme enables the optical neural networks 10 to achieve significantly higher inference accuracies in dynamic environments, it is believed that this invention will potentially expand the utilization of optical neural networks 10 to a plethora of new applications that demand real-time monitoring and classification of fast and dynamic events.

Methods $D^2$NN framework formulates the all-optical object classification problem from the point-of-view of training the physical features of matter inside a diffractive optical black-box. Each $D^2$NN was modeled digitally using five (5) successive substrate layers 20 in a transmission mode configuration, each representing a two-dimensional, thin modulation component (FIG. 9A). The optical modulation function of each diffractive substrate layer 20 was sampled with a period of 0.53λ over a regular 2D grid of coordinates, with each point representing the transmittance coefficient of a diffractive feature, i.e., an optical "neuron". The material thickness, h, was selected as the trainable physical parameter of each neuron, $$h = Q_4\left(\frac{\sin(h_a)+1}{2}(h_m - h_b)\right) + h_b, \qquad (2)$$

According to Eq. 2, the material thickness over each diffractive neuron is defined as a function of an auxiliary variable, $h_a$. The function, $Q_n(\cdot)$, represents the n-bit quantization operator and $h_m$, $h_b$ denote the pre-determined hyperparameters of the forward model determining the allowable range of thickness values, $[h_b, h_m]$. The thickness in Eq. 2 is related to the transmittance coefficient of the corresponding diffractive neuron through the complex-valued refractive index ($\tau$) of the optical material used to fabricate the resulting $D^2NN$, i.e., $\tau(\lambda)=n(\lambda)+j\kappa(\lambda)$, with $\lambda$ denoting the wavelength of the illumination light. Based on this, one can express the transmission coefficient, $t(x_q, y_p, z_k)$, of a diffractive neuron located at $(x_q, y_p, z_k)$ as;

$$t(x_q, y_p, z_k) = \exp\left(-\frac{2\pi\kappa h_{q,p}^k}{\lambda}\right)\exp\left(j(n-n_s)\frac{2\pi h_{q,p}^k}{\lambda}\right), \quad (3)$$

where $$h_{q,p}^k$$

refers to the material thickness over the corresponding neuron computed using Eq. 2, and $n_s$ is the refractive index of the medium, surrounding the diffractive layers; without loss of generality, it was assumed $n_s=1$ (air). Based on the earlier demonstrations of diffractive optical networks, it was assumed the optical modulation surfaces in the diffractive optical networks are made of a material with $\tau=1.7227+j0.031$. Accordingly, the h m and h b were selected as $2.2\lambda$, and $0.66\lambda$, respectively, as illustrated in FIGS. 10A-10D and FIGS. 16A-16C.

The 2D complex modulation function, $T(x, y, z_k)$, of a diffractive surface, $S_k$, located at $z=z_k$, can be written as:

$$T(x, y, z_k) = \sum_q\sum_p t(x_q, y_p, z_k)P(x-qw_x, y-pw_y, z_k), \quad (4)$$

where the $w_x$ and $w_y$ denote the width of a diffractive neuron in x and y directions, respectively (both taken as $0.53\lambda$). $P(x, y, z_k)$ represents the 2D interpolation kernel which was assumed to be an ideal rectangular function in the following form, $$P(x, y, z_k) = \begin{cases} 1, & |x| < \left(\frac{w_x}{2}\right) \text{ and } |y| < \left(\frac{w_y}{2}\right) \\ 0, & \text{otherwise} \end{cases}. \quad (5)$$

The light propagation in the presented diffractive optical networks were modeled based on the digital implementation of the Rayleigh-Sommerfeld diffraction equation, using an impulse response defined as:

$$w(x, y, z) = \frac{z}{r^2}\left(\frac{1}{2\pi r} + \frac{1}{j\lambda}\right)\exp\left(\frac{j2\pi r}{\lambda}\right), \quad (6)$$

where $r=\sqrt{x^2+y^2+z^2}$. Based on this, the wave field synthesized over a surface at $z=z_{k+1}$, $U(x, y, z_{k+1})$, by a trainable diffractive layer, $S_k$, located at $z=z_k$, can expressed as;

$$U(x, y, z_{k+1}) = U'(x, y, z_k)*w(x, y, z_{k+1}-z_k), \quad (7)$$

where $U'(x, y, z_k)=U(x, y, z_k)T(x, y, z_k)$ is the complex wave field immediately after the diffractive layer, k, and * denotes the 2D convolution operation. In this optical forward model, the layer-to-layer distances were taken as $40\lambda$ for the diffractive neural network architectures that have 40K neurons on each substrate layer 20 to induce optical connections between all the neurons of two successive diffractive layers 20 based on Eq. 6. To provide a fair comparison, for the diffractive neural network architectures with m=4 and m=9-fold larger diffractive layers as depicted in FIG. 12B, the layer-to-layer distances were also accordingly increased to be $(m)0.5\times40\lambda$, preserving the all-optical connections set by the diffraction cone angle between successive substrate layers 20 of these network models. Therefore, the improvement in inference accuracy for randomly shifting objects 14 demonstrated in FIG. 12B comes at the expense of using larger substrate layers 20 separated with larger distances, increasing both the lateral and the axial size of the diffractive neural network 10.

Based on the above outlined optical forward model, if one lets the complex-valued object transmittance, $T(x, y, z_0)$, over the input FOV be located at a surface defined with k=0, then the complex field and the associated optical intensity distribution at the output/detector plane where the optical sensors 28 are located of a 5-layer diffractive optical network architecture shown in FIG. 9A, can be expressed as $U(x, y, z_6)$ and $I=|U(x, y, z_6)|^2$, respectively. In the forward training model, it was assumed that each class detector 28 collects an optical signal, $\Gamma_c$, that is computed through the integration of the output intensity, I, over the corresponding detector active area ($6.4\lambda\times6.4\lambda$ per detector 28). For a given dataset with C classes, the standard $D^2NN$ architecture in FIG. 9A employs C detectors 28 at the output plane, each representing a data class; C=10 for MNIST dataset. Accordingly, at each training iteration, after the propagation of the input object 14 to the output plane (based on Eqs. 6 and 7), a vector of optical signals, $\Gamma$, is formed and then normalized to get $\Gamma'$ using the following relationship:

$$\Gamma' = \frac{\Gamma}{\max\{\Gamma\}}\times T_s, \quad (8)$$

where $T_s$ is a constant temperature parameter. Next, the class score of the $c^{th}$ data class, $\sigma_c$, is computed as:

$$\sigma_c = \frac{\exp(\Gamma'_c)}{\sum_{c\epsilon C}\exp(\Gamma'_c)}. \quad (9)$$

In Eq. 9, $$\Gamma'_c$$

denotes the normalized optical signal collected by the detector 28, c, computed as in Eq. 8. At the final step, the classification loss function, $\mathcal{L}$, in the form of the cross-entropy loss defined in Eq. 10 is computed for the subsequent error-backpropagation and update of the substrate layers 20:

$$\mathcal{L} = -\sum_{c \in C} g_c \log(\sigma_c), \quad 10$$

where g denotes the one-hot ground truth label vector.

For the digital implementation of the diffractive optical network training outlined above, a custom-written code was developed in Python (v3.6.5) and TensorFlow (v1.15.0, Google Inc.). The backpropagation updates were calculated using the Adam optimizer with its parameters set to be the default values as defined by TensorFlow and kept identical in each model. The learning rate was set to be 0.001 for all the diffractive neural network models. The training batch sizes were taken as 50 and 20 for the diffractive neural network designs with 40K neurons per layer and wider diffractive neural networks reported in FIG. 12B, respectively. The training of a 5-layer diffractive optical network with 40K diffractive neurons per layer takes ~6 hours using a computer with a GeForce GTX 1080 Ti Graphical Processing Unit (GPU, Nvidia Inc.) and Intel® Core™ i7-8700 Central Processing Unit (CPU, Intel Inc.) with 64 GB of RAM, running Windows 10 operating system (Microsoft). The training of a wider diffractive neural network presented in FIG. 12B, on the other hand, takes ~30 hours based on the same system configuration due to the larger light propagation windows used in the forward optical model. Since the investigated object transformations were implemented through a custom-developed bilinear interpolation code written based on TensorFlow functions, it only takes ~50 sec longer to complete an epoch with the presented scheme compared to the standard training of $D^2NNs$.

While embodiments of the present invention have been shown and described, various modifications may be made without departing from the scope of the present invention. The invention, therefore, should not be limited, except to the following claims, and their equivalents.

What is claimed is:

1. An optical neural network for processing an input object image or signal that is invariant or partially invariant to object or signal transformations comprising:

a plurality of optically transmissive or reflective substrate layers arranged in an optical path and separated from one another, each of the plurality of optically transmissive or reflective substrate layers comprising a plurality of physical features formed on or within the plurality of optically transmissive or reflective substrate layers and having different transmission or reflection coefficients as a function of lateral coordinates across each substrate layer, wherein the plurality of optically transmissive or reflective substrate layers and the plurality of physical features thereon collectively define a trained mapping function between the input object image or signal to the plurality of optically transmissive or reflective substrate layers and one or more output optical signal(s) created by optical diffraction through or optical reflection from the plurality of optically transmissive or reflective substrate layers;

a plurality of optical sensors configured to capture the one or more output optical signal(s) resulting from the plurality of optically transmissive or reflective substrate layers, with each optical sensor of the plurality associated with a particular object or signal class that is inferred or decided by the optical neural network and the output inference or decision is made based on a maximum signal among the plurality of optical sensors, which corresponds to a particular object class or signal class;

wherein the plurality of optically transmissive or reflective substrate layers are designed during a training phase to define the plurality of physical features formed on or within the plurality of optically transmissive or reflective substrate layers such that the one or more output optical signal(s) are substantially invariant to object or signal transformations comprising, rotation, scaling, rotation in combination with lateral translation, scaling in combination with lateral translation, or rotation in combination with scaling.

2. The optical neural network of claim 1, wherein the plurality of physical features of the plurality of optically transmissive or reflective substrate layers comprise regions of varied thicknesses.

3. The optical neural network of claim 1, wherein the plurality of physical features of the plurality of optically transmissive or reflective substrate layers comprise regions having different optical properties.

4. The optical neural network of claim 1, wherein the plurality of physical features of the plurality of optically transmissive or reflective substrate layers comprise regions having different refractive index or absorption or spectral features.

5. The optical neural network of claim 1, wherein the plurality of physical features of the plurality of optically transmissive or reflective substrate layers comprise metamaterials or metasurfaces.

6. The optical neural network of claim 1, wherein the plurality of optically transmissive or reflective substrate layers are positioned within or surrounded by vacuum, air, a gas, a liquid or a solid material.

7. The optical neural network of claim 1, wherein the plurality of optically transmissive or reflective substrate layers comprise at least one nonlinear optical material.

8. The optical neural network of claim 1, wherein the plurality of optically transmissive or reflective substrate layers comprises one or more physical substrate layers that comprise reconfigurable physical features that can change as a function of time.

9. An optical neural network for processing an input object image or signal that is invariant or partially invariant to object or signal transformations comprising:

a plurality of optically transmissive or reflective substrate layers arranged in an optical path and separated from one another, each of the plurality of optically transmissive or reflective substrate layers comprising a plurality of physical features formed on or within the plurality of optically transmissive or reflective substrate layers and having different transmission or reflection coefficients as a function of lateral coordinates across each substrate layer, wherein the plurality of optically transmissive or reflective substrate layers and the plurality of physical features thereon collectively define a trained mapping function between the input object image or signal to the plurality of optically transmissive or reflective substrate layers and one or more output optical signal(s) created by optical diffraction through or optical reflection from the plurality of optically transmissive or reflective substrate layers;

a plurality of optical sensors configured to capture the one or more output optical signal(s) resulting from the plurality of optically transmissive or reflective substrate layers wherein pairs of optical sensors of the plurality are associated with a particular object class or signal class that is inferred or decided by the optical neural network and the output inference or decision is made based on a maximum signal calculated using the optical sensor pairs, which corresponds to a particular object class or signal class; and wherein the plurality of optically transmissive or reflective substrate layers are designed during a training phase to define the plurality of physical features formed on or within the plurality of optically transmissive or reflective substrate layers such that the one or more output optical signal(s) are substantially invariant to object or signal transformations comprising rotation, scaling, rotation in combination with lateral translation, scaling in combination with lateral translation, or rotation in combination with scaling.

10. A method of forming a multi-layer optical neural network for processing an input object image or input optical signal that is invariant or partially invariant to object transformations comprising:

training a software-based neural network model to perform one or more specific optical functions for a multi-layer transmissive or reflective network having a plurality of layers with optically diffractive physical features located in different locations in each of the plurality of layers of the transmissive or reflective network, wherein the training comprises feeding a plurality of different input object images or input optical signals that have random transformations or shifts that comprise rotation, scaling, rotation in combination with lateral translation, scaling in combination with lateral translation, or rotation in combination with scaling to the software-based neural network model and computing at least one optical output of optical transmission or reflection through the multi-layer transmissive or reflective network using an optical wave propagation model and iteratively adjusting transmission/reflection coefficients for each layer of the multi-layer transmissive or reflective network until optimized transmission/reflection coefficients are obtained or a certain time or epochs have elapsed;

manufacturing or having manufactured a physical embodiment of the multi-layer transmissive or reflective network comprising a plurality of substrate layers arranged along an optical path and spaced from one another and having physical features that match the optimized transmission/reflection coefficients obtained by the trained neural network model and;

providing a plurality of optical sensors with each optical sensor of the plurality associated with a particular object class or signal class that is inferred or decided by the physical embodiment of the multi-layer transmissive or reflective network and the output inference or decision is made based on a maximum signal among the plurality of optical sensors, which corresponds to a particular object class or signal class.

11. The method of claim 10, wherein the optimized transmission/reflective coefficients are obtained by error back-propagation.

12. The method of claim 10, wherein the plurality of physical features of the plurality of optically transmissive or reflective substrate layers comprise regions having different optical properties.

13. The method of claim 10, wherein the plurality of physical features of the plurality of optically transmissive or reflective substrate layers comprise regions having different refractive index or absorption or spectral features.

14. The method of claim 10, wherein the physical embodiment of the multi-layer transmissive or reflective network is manufactured by additive manufacturing.

15. The method of claim 10, wherein the physical embodiment of the multi-layer transmissive or reflective network is manufactured by lithography.

16. The method of claim 10, wherein the plurality of optically transmissive or reflective substrate layers are positioned within or surrounded by vacuum, air, a gas, a liquid or a solid material.

17. The method of claim 10, wherein the physical embodiment of the multi-layer transmissive or reflective network comprises one or more physical substrate layers that comprise a nonlinear optical material.

18. The method of claim 11, wherein the physical embodiment of the multi-layer transmissive or reflective network comprises one or more physical substrate layers that comprise reconfigurable physical features that can change as a function of time.

19. The method of claim 10, wherein the training further comprises feeding a plurality of different input object images or input optical signals that have random affine transformations or warping or aberrations to the software-based neural network.

20. A method of forming a multi-layer optical neural network for processing an input object image or input optical signal that is invariant or partially invariant to object transformations comprising:

training a software-based neural network model to perform one or more specific optical functions for a multi-layer transmissive or reflective network having a plurality of layers with optically diffractive physical features located in different locations in each of the plurality of layers of the transmissive or reflective network, wherein the training comprises feeding a plurality of different input object images or input optical signals that have random transformations or shifts that comprise rotation, scaling, rotation in combination with lateral translation, scaling in combination with lateral translation, or rotation in combination with scaling to the software-based neural network model and computing at least one optical output of optical transmission or reflection through the multi-layer transmissive or reflective network using an optical wave propagation model and iteratively adjusting transmission/reflection coefficients for each layer of the multi-layer transmissive or reflective network until optimized transmission/reflection coefficients are obtained or a certain time or epochs have elapsed; and manufacturing or having manufactured a physical embodiment of the multi-layer transmissive or reflective network comprising a plurality of substrate layers arranged along an optical path and spaced from one another and having physical features that match the optimized transmission/reflection coefficients obtained by the trained neural network model; and providing a plurality of optical sensors wherein pairs of optical sensors of the plurality are associated with a particular object class or signal class that is inferred or decided by the physical embodiment of the multi-layer transmissive or reflective network and the output inference or decision is made based on a maximum signal calculated using the optical sensor pairs, which corresponds to a particular object class or signal class.

* * * * *